United States Patent
Tachikawa et al.

(10) Patent No.: US 6,181,820 B1
(45) Date of Patent: Jan. 30, 2001

(54) IMAGE EXTRACTION METHOD AND APPARATUS AND IMAGE RECOGNITION METHOD AND APPARATUS FOR EXTRACTING/RECOGNIZING SPECIFIC IMAGES FROM INPUT IMAGE SIGNALS

(75) Inventors: Michiyoshi Tachikawa, Yokohama; Toshio Miyazawa, Kawasaki; Akihiko Hirano, Tokyo, all of (JP)

(73) Assignee: Ricoh Company. Ltd., Tokyo (JP)

( * ) Notice: Under 35 U.S.C. 154(b), the term of this patent shall be extended for 0 days.

(21) Appl. No.: 09/457,366

(22) Filed: Dec. 9, 1999

Related U.S. Application Data

(62) Division of application No. 08/904,617, filed on Aug. 1, 1997, now Pat. No. 6,115,495, which is a continuation of application No. 08/354,878, filed on Dec. 9, 1994, now abandoned.

(30) Foreign Application Priority Data

| Dec. 10, 1993 | (JP) | 5-310694 |
| Dec. 10, 1993 | (JP) | 5-310696 |
| Feb. 15, 1994 | (JP) | 6-18591 |
| Mar. 23, 1994 | (JP) | 5-52286 |

(51) Int. Cl.[7] ............................. G06K 9/36
(52) U.S. Cl. .......................... 382/190; 382/286
(58) Field of Search .................. 382/173, 175, 382/181, 190, 193, 203, 286, 289

(56) References Cited

U.S. PATENT DOCUMENTS

| 4,776,027 | 10/1988 | Hisano et al. . |
| 4,959,868 | * 9/1990 | Tanioka ................ 382/176 |
| 5,065,446 | * 11/1991 | Suzuki et al. ......... 382/253 |
| 5,099,521 | * 3/1992 | Kosaka ................. 382/171 |

(List continued on next page.)

FOREIGN PATENT DOCUMENTS

| 0 281 725 A2 | 9/1988 | (EP) . |
| 0 294 497 A1 | 12/1988 | (EP) . |
| 55-162177 | 12/1980 | (JP) . |
| 57-2539 | 1/1982 | (JP) . |
| 4-54681 | 2/1992 | (JP) . |
| 4-180348 | 6/1992 | (JP) . |
| 4-205274 | 7/1992 | (JP) . |
| 4-205280 | 7/1992 | (JP) . |
| 4-207466 | 7/1992 | (JP) . |

OTHER PUBLICATIONS

Color Indexing, Michael J. Swain, Dana H. Ballard, 8370 International Journal of Computer Vision Nov. 7, 1991, No. 1, Norwell, MA, US, pp. 11–32.

*Primary Examiner*—Andrew W. Johns
(74) *Attorney, Agent, or Firm*—Oblon, Spivak, McClelland, Maier & Neustadt, P.C.

(57) ABSTRACT

A circumscribing rectangle is obtained for a black continuous image part using a two-tone image signal. If it is determined that the image part is possibly one which is obtained as a result of rotating the object, lengths of sides of the image part are compared with threshold values. If it is determined that the image part is not one which is obtained as a result of rotating the object, the height and horizontal length of the circumscribing rectangle are compared with the threshold values. Thus, it is determined whether or not the image part is identical to the object. An RGB chromaticity histogram is produced for each of small regions of an input color image. Each of the chromaticity histograms of the small regions is compared with reference ones. As a result of the comparison, an identification number of the reference histogram having the highest similarity to that of the small region among those constituting the input image is given to the small region. A histogram of the identification numbers thus is produced for the input color image. The thus-produced histogram is used to determine which one of a plurality of objects is identical to the input color image.

6 Claims, 19 Drawing Sheets

U.S. PATENT DOCUMENTS

| | | | | |
|---|---|---|---|---|
| 5,150,432 | * | 9/1992 | Ueno et al. | 382/258 |
| 5,151,951 | * | 9/1992 | Ueda et al. | 382/195 |
| 5,247,357 | * | 9/1993 | Israelsen | 358/133 |
| 5,263,098 | | 11/1993 | Horikami . | |
| 5,271,068 | * | 12/1993 | Ueda et al. | 382/209 |
| 5,444,797 | * | 8/1995 | Spitz et al. | 382/192 |
| 5,502,777 | * | 3/1996 | Ikemure | 382/173 |
| 5,521,988 | * | 5/1996 | Li et al. | 382/248 |
| 5,557,688 | * | 9/1996 | Nakamura | 382/164 |
| 5,642,288 | * | 6/1997 | Leung et al. | 364/478.11 |
| 5,652,803 | * | 7/1997 | Tachikawa et al. | 382/135 |
| 5,751,854 | * | 5/1998 | Saitoh et al. | 382/218 |
| 5,757,957 | * | 5/1998 | Tachikawa | 382/176 |
| 5,774,580 | * | 6/1998 | Saitoh | 382/176 |

* cited by examiner

F I G. 1
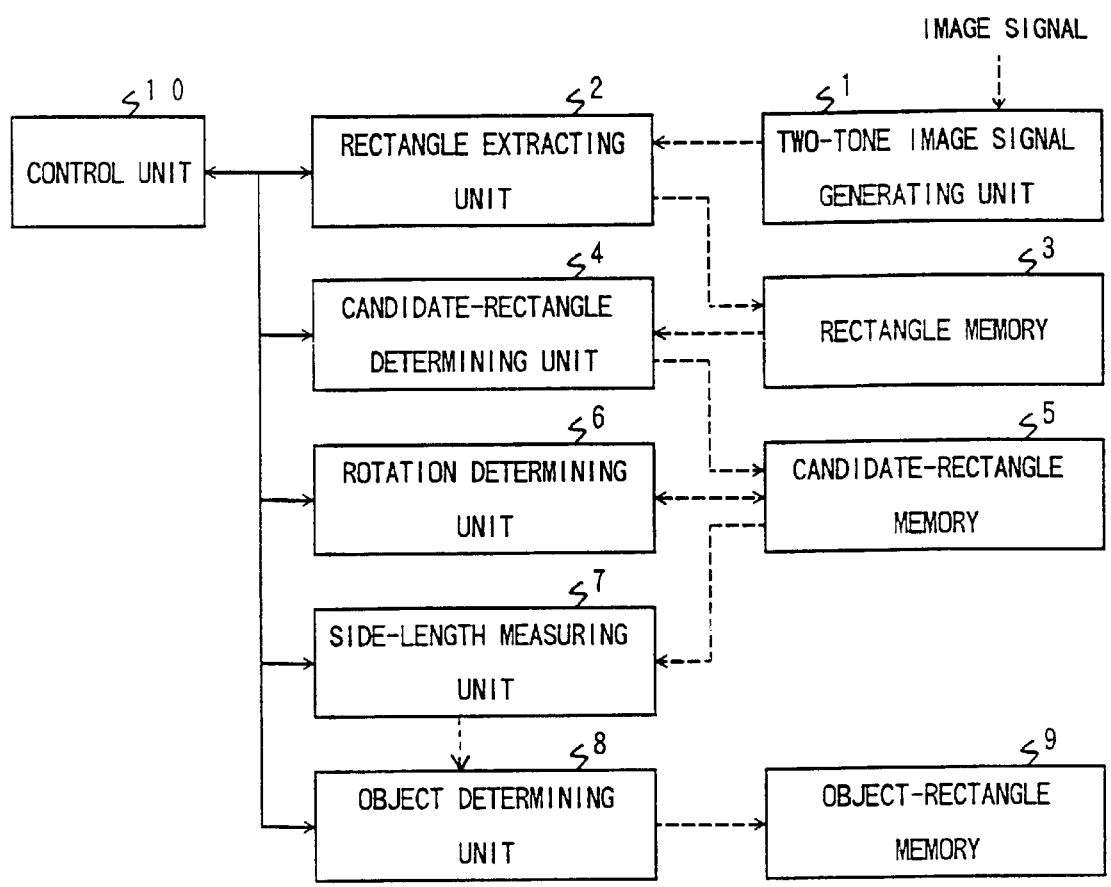

FIG. 10

| 10 | 8 | 7 | 2 | 4 | 9 | 6 | 8 | 5 |
|----|---|---|---|---|---|---|---|---|
| 3  | 8 | 4 | 2 | 4 | 2 | 4 | 2 | 5 |
| 10 | 4 | 1 | 7 | 6 | 9 | 6 | 8 | 4 |
| 2  | 8 | 7 | 2 | 4 | 2 | 6 | 5 | 5 |
| 10 | 5 | 7 | 5 | 1 | 9 | 1 | 3 | 5 |
| 10 | 5 | 4 | 8 | 5 | 3 | 6 | 8 | 5 |
| 10 | 8 | 7 | 2 | 6 | 9 | 4 | 8 | 1 |
| 5  | 2 | 7 | 2 | 5 | 3 | 6 | 2 | 5 |
| 1  | 8 | 1 | 2 | 4 | 1 | 6 | 8 | 1 |
| 10 | 8 | 7 | 2 | 6 | 9 | 2 | 6 | 5 |
| 3  | 3 | 7 | 2 | 4 | 9 | 6 | 3 | 5 |

IMAGE EXTRACTION METHOD AND APPARATUS AND IMAGE RECOGNITION METHOD AND APPARATUS FOR EXTRACTING/RECOGNIZING SPECIFIC IMAGES FROM INPUT IMAGE SIGNALS

This application is a divisional of application Ser. No. 08/904,617, filed Aug. 1, 1997, now U.S. Pat. No. 6,115,495, which is a continuation of application Ser. No. 08/354,878, filed Dec. 9, 1994, now abandoned.

BACKGROUND OF THE INVENTION

1. Field of the Invention

The present invention relates to an object extraction method and apparatus for extracting a specific image from color images or black-and-white images. Further present invention relates to a color-image recognition method and apparatus for determining whether the thus-extracted specific image is an image from given images. In practice, such a specific-image extraction is performed as follows: Data representing a specific image is extracted from data representing color images or black-and-white images. Further, data representing a specific image part is extracted from data representing a specific color image or a black-and-white image.

Each of the color-image recognition method and apparatus uses the thus-extracted specific image and then determines whether the specific image corresponds to an image included in given images, which are, for example, images constituting an image database, in particular, a color-image database.

In an example, such a technique may be applied to works in a police office. The police office may have a database of criminals' face photographs. When a montage picture (composite picture) is given by a witness, the police officer attempts to determine whether the image of the thus-given picture is an image included in the database.

In another example, an intelligent building may use such a technique. A microcomputer is provided inside a door of a room of a firm and the microcomputer uses a database of employees' face photographs. If a person comes in front of the door, the microcomputer uses a CCD camera to take image data of the person's face and, by using the thus-taken image data, the microcomputer attempts to determine whether the same image data is included in the database. If the microcomputer has succeeded in determining the same image data is in the employees' face database, the microcomputer opens the door for the person, and if not, the microcomputer does not open it. Thus, no real key is needed for the door.

In another example, such a technique may be used to prevent bank notes and securities from being replicated. A duplicator may have image data of bank notes and securities and if an operator sets an original image on the duplicator to obtain a copy thereof, the duplicator checks if data of the thus-set original image is included in the image data of bank notes and securities.

2. Prior Art

Apparatuses processing color images such as a color duplicator, a color printer, a color scanner, a color-image communication apparatus, and so forth are expected to be further developed in the future. It has become easier to handle the color images by hardware development, such as cost reductions and capacity increase of various sorts of memories, data-communication cost reduction and so forth.

However, since data representing the color images has a huge data amount (for example, 96 Mbytes for an image of the A3 size) it is impossible to handle the color images similarly to handling data representing two-tone images.

In particular, in handling image data, a complicated process such as image recognition (such as recognition of a specific image, OCR or the like) requires a huge amount of data to be processed.

Therefore, it is further difficult to realize the image recognition for the color images.

Various methods have been proposed as an object extraction method for extracting an object to be recognized. In an example method, the method extracts black-continuity rectangles from a relevant image and compares values representing the thus-extracted rectangles with predetermined threshold values. The method classifies the rectangles into rectangles representing characters and rectangles representing line drawings. See Japanese Laid-Open Patent Application No.55-162177. However, this method neither classifies the thus-classified rectangles of line drawings into rectangles representing horizontal ruled-lines, nor has a capability to extract a specific image even if the relevant image is present but is in a rotated form.

As an apparatus and method for identifying a specific color image, a color-image processing apparatus (see Japanese Laid-Open Patent Application No.4-54681) was proposed, which apparatus extracts a hue and a distribution of the hue from a given region of an original image and thus detects whether or not a specific image is present. However, the above-described apparatus uses only 32 points to be sampled, the number of points to be sampled being a few in order to reduce a data amount to be processed. Such using of a few sampled points may not result in obtaining a sufficient amount of information required to extract characteristics of a relevant image. Therefore, it is not possible to obtain highly accurate image identification performance.

Further, a method was proposed for determining whether or not a specific color appears and then extracting image parts having the same characteristics (see Japanese Laid Open Patent Application No.4-180348). Each of patterns constituting an image has a particular stretch in a color space. The above-mentioned method uses such specific stretches, in the color space, of the patterns to identify a certain image part as being a specific image part, the certain image part having specific stretches in the color space the same as those of the specific image part. However, the method cannot distinguish image parts having the same stretch in the color space but a different color distribution inside the stretch. Thus, if a certain image part has a stretch in the color space, which stretch is the same as the stretch of a specific image part, but a color distribution inside the stretch is different from that of the stretch of the specific image part, the method may erroneously identify the certain image part as being the specific image part.

SUMMARY OF THE INVENTION

An object of the present invention is to provide an object extraction method and apparatus, each of which extracts an image region corresponding to an object from an input image with high accuracy.

Another object of the present invention is to provide a color-image recognition method and apparatus, each of which method and apparatus extracts an object from an input image and performs a color-image recognition operation on the object. Each of the color-image recognition method and apparatus obtains a sufficient amount of information required for the color-image recognition operation so that high-accuracy color-image recognition can be achieved with a data amount to be processed being compressed.

Another object of the present invention is to provide a color-image recognition method and apparatus, each of which method and apparatus uses a table-conversion manner to convert relevant data, instead of performing a calculation operation, so as to compress the amount of the relevant data. Thus, it is possible to achieve an effective data-amount compression.

Another object of the present invention is to provide a color-image recognition method and apparatus, each of which method and apparatus suppresses an adverse effect of noise image information. The noise image information may be included in relevant information as a result of, for example, an image scanner reading in information of not only a relevant image printed on a relevant sheet but also of another image which is printed on another sheet subsequent to the relevant sheet. The image of the subsequent sheet may be read by the scanner through the relevant sheet if it is thin. Each of the method and apparatus performs a vector quantizing operation only on the relevant image information. Thus, image-recognition capability and data processing speed are improved.

Another object of the present invention is to provide a color-image recognition method and apparatus, each of which method and apparatus determines a similarity between information of an input image and information of a predetermined code book information. If the thus-determined similarity is higher than a predetermined threshold value, no vector-quantizing value is assigned to the information of the input image. Thus, image-recognition capability and data processing speed are improved.

To achieve the above-mentioned objects, an object extracting system according to the present invention determines a circumscribing rectangle for a black continuous image part using a two-tone image signal. A height and a horizontal length of the rectangle are then compared with threshold values. If an operator specifies that an object to be extracted from an input image has a rectangular shape, whether or not the relevant image part is possibly one which is obtained as a result of rotating the object is determined. If it is determined that the image part is possibly one which is obtained as a result of rotating the object, under an assumption that the image part also has a rectangular shape, lengths of sides of the image part are compared with threshold values. If it is determined that the image part is not one which is obtained as a result of rotating the object, the height and horizontal length of the circumscribing rectangle is the threshold values. Thus, it is determined whether or not the image part is identical to the object.

Further, each color image recognition method and apparatus according to the present invention divides an input image into small regions. An RGB (red, green and blue) chromaticity histogram is produced for each of the small regions. Each of the chromaticity histograms of the small regions is compared with reference ones, named code book information, previously produced and stored. Each of the thus-stored reference chromaticity histograms has an identification number. As a result of the comparison, the identification number of the histogram having the highest similarity to that of the small region among those constituting the input image is given to the small region. A histogram of the identification numbers thus given to the small regions constituting the input image is produced. The thus-produced histogram is compared with reference ones, named dictionary information, previously produced and stored. As a result of the comparison, a reference histogram of identification numbers among the thus-stored reference ones is selected, the thus-selected one having the highest similarity to that of the input image. Each of the above-mentioned reference histograms of identification numbers corresponds to a respective one of a plurality of objects. As a result of the above-mentioned selection, one of the plurality of objects is determined to be identical to the input image. Thus, the input image is recognized.

Other objects and further features of the present invention will become more apparent from the following detailed description when read in conjunction with the accompanying drawings.

BRIEF DESCRIPTION OF DRAWINGS

FIG. 1 shows a block diagram of an object extraction system in a first embodiment of object extraction method and apparatus according to the present invention;

FIGS. 9 and 10 illustrate a vector quantizing operation performed by a vector quantizing executing unit shown in FIG. 7;

DESCRIPTION OF PREFERRED EMBODIMENTS

Figure 2:
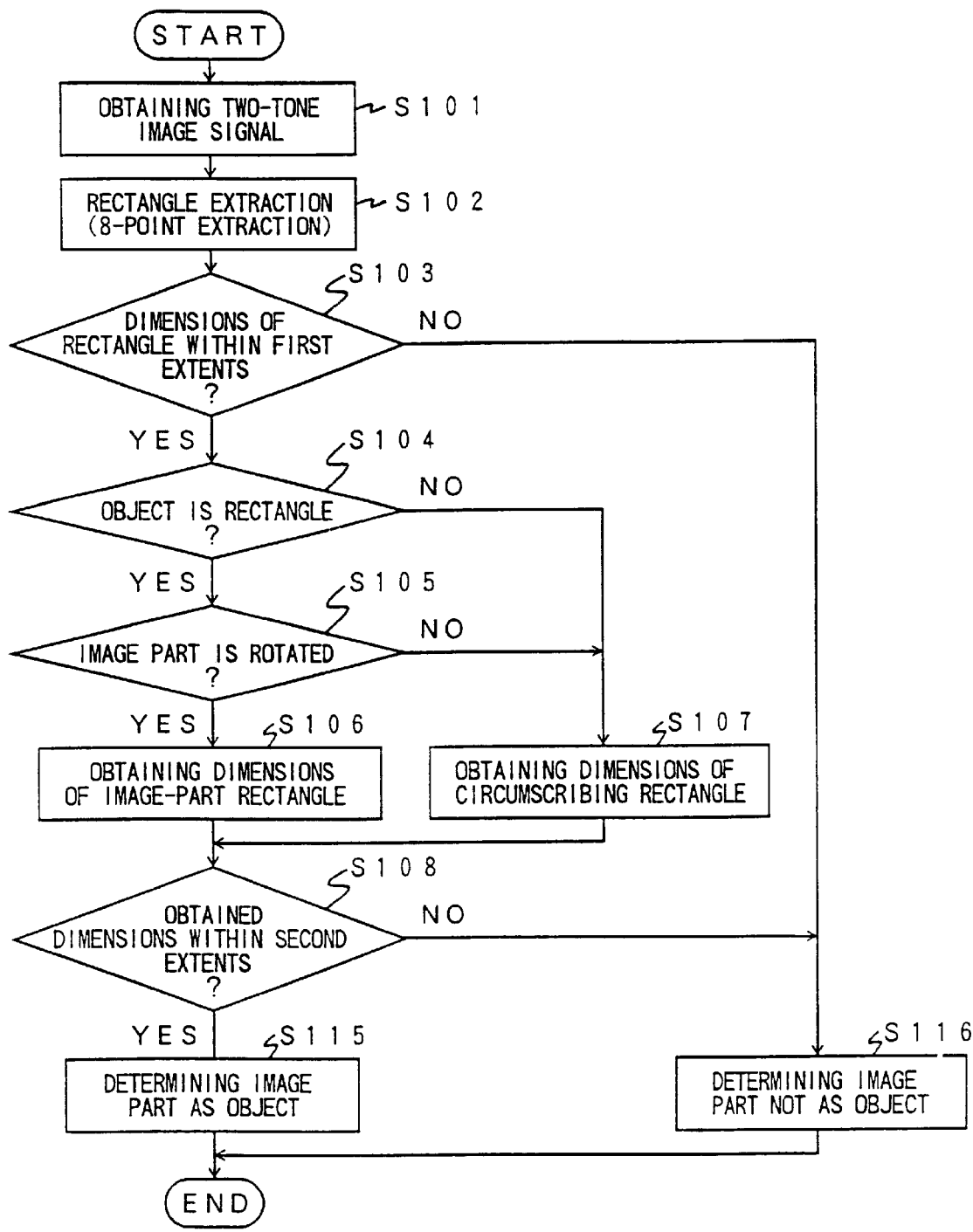
FIG. 2 shows an operation flow chart of the above-mentioned object extraction system shown in FIG. 1.

With reference to FIG. 1, an object extraction system in a first embodiment of object extraction method and apparatus according to the present invention will now be described. In general, the system is effective in the use of an image having a rectangular outline as the object, an image part corresponding to the object being extracted through the system. That is, the system is produced generally based on an assumption that the image part has a rectangular shape. Accordingly, names of units in the system and associated expressions may be those based on the object having a rectangular outline. However, the system can use a figure other than a rectangle as the object. A two-tone image signal generating unit 1 generates a two-tone image signal using an input image. A circumscribing rectangle extracting unit 2 extracts circumscribing rectangles from the thus-generated two-tone image signal.

Hereinafter, to extract a circumscribing rectangle means to obtain a circumscribing rectangle described below. The circumscribing rectangle is a rectangle, two of four sides of which extend along a scan-line direction in which the input image is scanned so as to be read in. The circumscribing rectangle is extracted for a black-continuity image part present in an image represented by the two-tone image signal. The black-continuity image parts includes black pixels constituting a black continuous region in the image. The circumscribing rectangle is a rectangle which circumscribes the relevant black-continuity image part.

A rectangle memory 3 stores rectangle data representing the thus-extracted circumscribing rectangle. A candidate-rectangle determining unit 4 uses the thus-stored circumscribing rectangle data and then compares a horizontal length and a height of each of the circumscribing rectangles with first preset threshold values (representing first preset extents for the object). The first preset extents are an extent in height and an extent in horizontal dimension. Thus, the determining unit 4 determines whether or not each circumscribing rectangle might possibly correspond to an object which is a black-continuity image part to be extracted from the image. Further, the candidate-rectangle determining unit 4 determines whether or not a shape of the object is a rectangle.

If the candidate-rectangle determining unit 4 has determined the circumscribing rectangle to possibly be the object, a candidate-rectangle memory 5 stores candidate-rectangle data representing the thus-determined circumscribing rectangle which will be referred to as a candidate rectangle.

A rotation determining unit 6, if the candidate-rectangle determining unit 4 has determined the shape of the object is a rectangle, further checks the candidate rectangle. The rotation determining unit 6 determines whether or not the relevant candidate rectangle may possibly include the object therein and the relevant image part is possibly one which was obtained as a result of rotating the object.

A side-length measuring unit 7 measures a length of a longer side and a length of the shorter side of the relevant black-continuity image part. An object determining unit 8 compares the thus-measured lengths with second preset threshold values (representing a second preset extent for the object) so as to determine whether or not the candidate rectangle corresponds to the object. The second preset extents are an extent in height and an extent in horizontal dimension. The second preset extents for the object are narrower than the above-mentioned first preset extents for the object, respectively. By using the first and second preset extents for the object, it is possible to step by step determine the possibility of the relevant image part corresponding to the object. Thus, using the first extents for the object, if the relevant image part actually corresponds to the object but the image part is one which is obtained as a result of rotating the object, failing to extract the image part can be prevented since the first extents for the object are relatively wide respectively. Using the relatively narrow second extents for the object, it is possible to accurately determine the correspondence between the relevant image part and the object. An object-rectangle memory 9 stores data representing the outline of the relevant image part if the candidate rectangle has been determined to correspond to the object through the object determining unit 8. A control unit 10 controls the units 2, 4, 6, 7 and 8 in the system.

With reference to FIG. 2, an operation flow chart of the object extraction system shown in FIG. 1 will now be described. A step S101 generates the two-tone image signal using the input image through the two-tone image signal generating unit 1. Specifically, for example, the input image may be input in a form of a multi-tone image black-and-white signal, and the unit 1 may have a predetermined threshold value. The unit 1 uses the predetermined threshold value and thus obtains the two-tone image signal.

That is, if a value of a pixel represented by the multi-tone image signal is equal or less than the threshold value, the value is determined to be a black pixel and if the value of the pixel is greater than the threshold value, the pixel is determined to be a white pixel.

A step S102 extracts the circumscribing rectangle from the two-tone image signal through the rectangle extracting unit 2. Any one of methods proposed by the present applicant through Japanese Laid-Open Patent Applications Nos.3-341889, 4-267313, 4-160866 and so forth may be used for the circumscribing-rectangle extraction.

Figure 3:
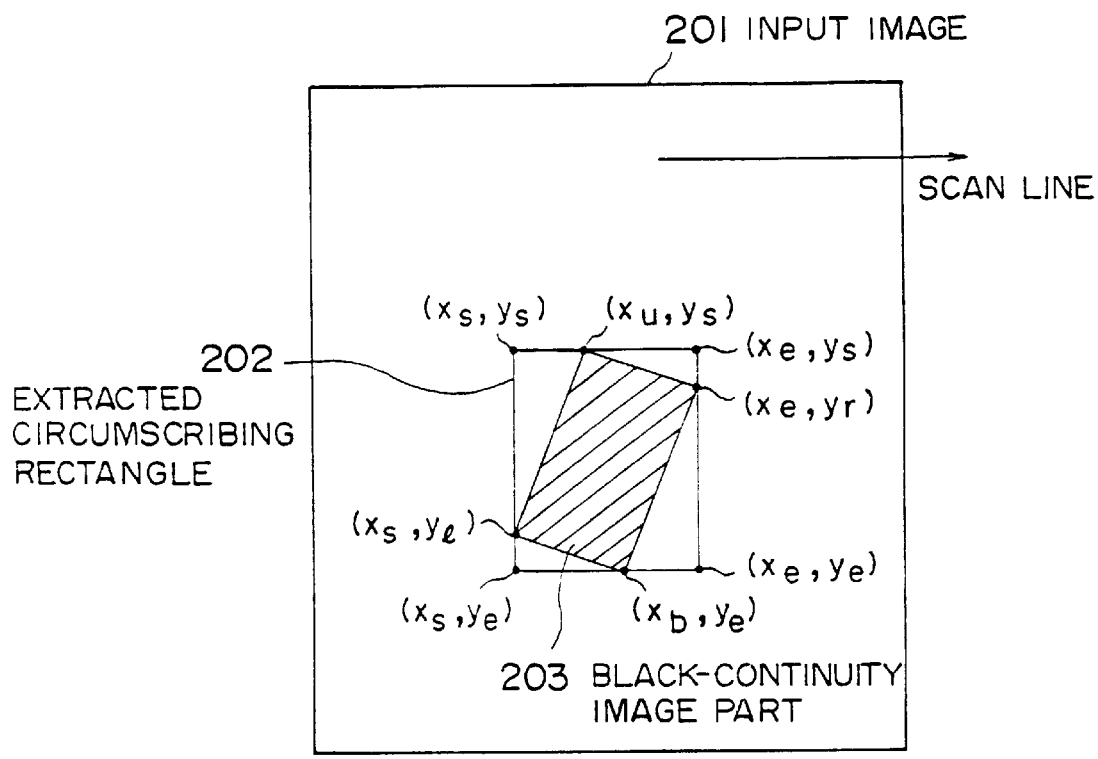
FIG. 3 illustrates a method of recognizing a location of a circumscribing rectangle and a location of an image part circumscribed by the circumscribing rectangle, the method being performed by a rectangle extracting unit in the system shown in FIG. 1.

FIG. 3 shows a circumscribing rectangle 202, as an example, extracted from the input image 201. The circumscribing rectangle 202 is that extracted for the black-continuity image part 203. According to the first embodiment, in the step S102, coordinates $(x_s, y_s)$ $(x_e, y_e)$, $(x_s, y_e)$ and $(x_e, y_s)$ of four vertexes of the rectangle 202 are extracted. Further, simultaneously to the vertex-coordinate extraction, coordinates $(x_u, y_s)$, $(x_e, Y_r)$, $(x_s, y_l)$ and $(x_b, y_e)$ for points at which the circumscribing rectangle comes into contact with the black-continuity image part are extracted.

The above description has been made based on the image part 203 being a rectangle. However if the image part 203 is not a rectangle, a similar method may be applied. That is, if the image part 203 is any figure, a number of points are present at which the image part comes into contact with the circumscribing rectangle. The step S102 may obtain coordinates of the number of points and data of the thus-obtained coordinates may be used in the subsequent steps similarly to those obtained in the case where the image part 203 is a rectangle. An essential point is that if the object is present in the input image part, it should be accurately extracted. Thus, which figure the relevant image part 203 is, is not an essential point, but it is essential that comparison between reference data associated with the object and data associated with the relevant image part 203 should be accurately performed. Such accurate comparison is achieved as a result of ensuring that how the reference data associated with the object was obtained is the same as how the data, to be compared with the reference data, associated with the image part 203 is obtained. The above-described method for obtaining information indicating the position of the outline of the circumscribing rectangles and that of the image parts is a method that is simple yet enables an effective position recognition.

A step S103 determines whether or not the height and the horizontal length of the circumscribing rectangle are in the first preset extents for the object through the candidate-rectangle determining unit 4. That is, the step S103 determines whether or not the height is present between a relevant preset maximum allowable limit and a minimum allowable limit and similarly determines whether or not the horizontal length is present between a relevant preset maximum allowable limit and a minimum allowable limit. If at least one of the height and horizontal length is not present within the relevant extent, a step S116 determines that the relevant image part does not correspond to the object. One of the above-mentioned methods proposed by the present applicant may be used for the dimension-using object-candidate determining operation performed by the step S103. A step S104 determines whether or not the shape of the object is a rectangle through the candidate-rectangle determining unit 4. Whether or not the shape of the object is a rectangle is, for example, previously input by an operator and the thus-input data is preset in the candidate-rectangle determining unit 4 before the above-described object extracting operation is actually performed. It is noted that determining in S104 whether or not the shape of the object is a rectangle is performed based on information from the outside of the system, but not based on a result of the system's checking the actually input image signal.

Figure 4:
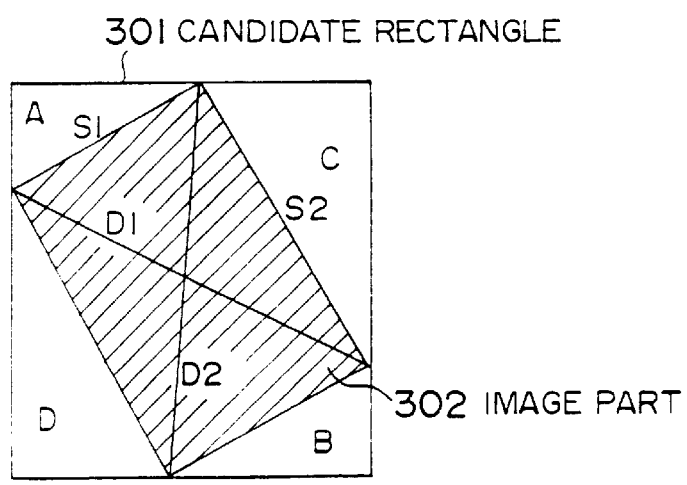
FIG. 4 illustrates a method of determining whether or not the relevant image part is possibly one obtained as a result of rotating an object, the method being performed by a rotation determining unit in the system shown in FIG. 1.

If the step S104 has determined that the object shape is a rectangle, a step S105 determines whether or not a rotation angle is present between the relevant image part and the scan-line direction through the rotation determining unit 6. FIG. 4 shows a candidate rectangle 301 for an image part 302 as an example. The rotation determination is performed in the following manner. If the image part 302 is a rectangle as shown in FIG. 4, it is determined whether or not a triangle A is congruent with a triangle B and also it is determined whether or not a triangle C is congruent with a triangle D, shown in FIG. 4. If at least one of the above-mentioned two congruities is not admitted in the rotation determination, it is determined that the relevant image part is not one which was obtained as a result of rotating the object. If each of the above-mentioned two congruities is admitted in the rotation determination, it is determined that the relevant image part is possibly one which was obtained as a result of rotating the object. Further, if the above-mentioned coordinates $(x_s, y_s)$, $(x_e, y_e)$, $(x_s, y_e)$ and $(x_e, y_s)$ of the four vertexes of the rectangle 202 are coincide with the coordinates $(x_u, y_s)$, $(x_e, y_r)$, $(x_s, y_l)$ and $(x_b, y_e)$ of the points at which the circumscribing rectangle comes into contact with the black-continuity image part are extracted, respectively, it is determined that the relevant image part is not one which was obtained as a result of rotating the object.

Further, a length of a diagonal line D1 is compared with a length of the other diagonal line D2 of the image part 302 as shown in FIG. 4. Each length of the lengths of the diagonal lines D1 and D2 is calculated from the coordinates, such as $(x_u, y_s)$, $(x_e, y_r)$, $(x_s, y_l)$ and $(x_b, y_e)$ shown in FIG. 3, of the rectangle data obtained for the image part 302 by the step S102. As a result of the above-mentioned length comparison, if a difference between the lengths of the diagonal lines D1 and D2 is relatively long, it is determined that the relevant image part has a shape of a diamond and not of a rectangle, thus the image part 302 is not one obtained as a result of rotating the object. Such a method for determining the rotation of the object using the congruency of the triangles is a simple method simple but enables effective rotation determination.

If the step S105 has determined that the image part is possibly one obtained as a result of rotating the object, a step S106, through the side-length measuring unit 7, calculates a length s1 of a first side and a length s2 of a second side adjoining the first side of the image part 302 and shown in FIG. 4. The length calculation is performed using the coordinates, such as $(x_u, y_s)$, $(x_e, y_r)$, $(x_s, y_l)$ and $(y_b, y_e)$ shown in FIG. 3, of the rectangle data obtained for the image part 302 by the step S102. The step S106 then determines the thus-calculated lengths as lengths of a short side and a long side of the relevant image part. However, if the step S104 has determined that the shape of the object is not a rectangle, the step S107 determines that the height and horizontal length of the circumscribing rectangle are the lengths of the short side and long side of the image part. Further, if the step S105 has determined that the image part is not one obtained as a result of rotating the object, the step S107 determines that the height and horizontal length of the circumscribing rectangle are the lengths of the short side and long side of the image part.

A step S108 determines whether or not the thus-determined lengths of the short side and long side of the image part are in the second preset extents for the object through the object determining unit 8. That is, the step S108 determines whether or not the short-side length is present between a relevant preset maximum allowable limit and a minimum allowable limit and similarly determines whether or not the long-side length is present between a relevant preset maximum allowable limit and a minimum allowable limit. If at least one of the short-side and long-side lengths is not present within the relevant extent, a step S116 determines that the relevant image part does not correspond to the object. If the short-side and long-side lengths are present within the relevant extents, respectively, the step S115 determines that the relevant image part corresponds to the object. The above-described operation flow shown in FIG. 2 will be performed on all the black-continuity image parts included in the input image in the form of the two-tone image signal.

The determination performed in the step S104 is based on, for example, the operator's input as mentioned above. Therefore, whether or not the two-tone image signal obtained in the step S101 corresponds to a rectangle depends on cases. That is, as one case, it is assumed that the object to be extracted is a rectangular business card which is made of a small white paper sheet having black letters printed thereon. In such a case, the operator may determine the object as being a rectangle and thus inputs information, indicating the object as being a rectangle, into the candidate-rectangle determining unit 4. Then, if the identical business card is used as an image part to be checked through the object extraction system shown in FIG. 1, the two-tone image signal generating unit 1 generates the signal representing the black letters printed on the white paper sheet, but does not generate that representing the white paper sheet, in the step S101. As a result, the step S102 extracts the rectangles of the black letters.

In one typical rectangle extraction method, one rectangle is extracted for each black letter and thus, a combination of the rectangles for the black letters is obtained through the step S101, a general overall outline the above-mentioned combination does not ordinarly have a rectangular shape. As a result, the shape of the image part is determined as not being a rectangle. However, the step S104 determines the object as being a rectangle according to the above-mentioned operator's input. In such a case, the step S104 determines YES and the step S105 determines NO. This is because the above-mentioned triangle congruity described with reference to FIG. 4 is not admitted in the rotation determination, as a result of the relevant image part (302 in FIG. 4) being the combination of the rectangles and the combination having a general overall outline not of a rectangular shape as mentioned above. Whether or not the relevant image part is present as one resulting from being rotated, the triangle congruity is not admitted, unless the relevant image part has a general overall outline of a rectangular shape. In fact, if the relevant image part does not have a rectangular overall outline, a shape of each of areas present defined by a part of a border of the circumscribing rectangle and a part of the outline of the relevant image part does not constitute a triangle. In such a case, the step S107 is executed after the step S105. Thus, the step S107 is performed correctly for the relevant image part which is not a rectangle in this case although the step S104 determines the object as being the rectangle. In such a case, the above-mentioned second preset extents for the object were predetermined so as to match the black letters of the business card. A longer one of a height and a horizontal length of the combination of the rectangles for black letters of the business card is used as the long-side length used in the step S108 as the reference data. Further, a shorter one of the height and horizontal length is used as the short-side length used therein. Thus, the relevant image part is correctly determined as the object in the step S115 unless the relevant image part is one resulting from rotating the object.

It is noted that, normally, each letter of such black letters of the business card may be determined as being an individual small black-continuity image part and thus result in an individual small circumscribing rectangle through the rectangle extracting unit 2. The thus-obtained small circumscribing rectangles for the black letters of the business card may be integrated into a single rectangle, the integration being performed on circumscribing rectangles which have mutual distances each distance being shorter than a predetermined threshold value. Thus, the above-mentioned combination of the rectangles for black letters of the business card can be obtained. The above-mentioned predetermined threshold value may be determined to match geometric arrangement of letters printed in such a business card. Such an integrating step may be inserted in the rectangle extraction step S102 in a case where such letters printed on a business card are used as the above-mentioned object.

Further, it is possible to insert, between the two-tone image signal generating unit 1 and the rectangle extracting unit 2, an image compressing unit for converting each group of 8 pixels of the input image in the form of the two-tone image signal into one pixel. Thus, an image signal obtained as a result of compressing the two-tone image signal is obtained and the thus-obtained image signal is used to extract the circumscribing rectangles.

An object extraction system in a second embodiment of an object extraction method and apparatus according to the present invention will now be described. Differences between the object extraction system in the second embodiment and that in the first embodiment is that the system in the second embodiment uses a color-image signal as the input signal while the system in the first embodiment uses the multi-tone black-and-white-image signal as the input signal as described above. Except for this point, the two systems are identical. Specifically, the two-tone image signal generating unit 1, shown in FIG. 1, in the system in the second embodiment operates as follows:

It is assumed that the input color-image signal carries three color component reflectance values R (red), G (green) and B (blue) for each pixel. The reflectance values are large if the pixel is white and the reflectance values are small if the pixel is black. The two-tone image signal generating unit 1 derives a lightness value L using the reflectance values R, G and B through the following equation:

$$L=R+G+B$$

The two-tone image signal generating unit 1 in the second embodiment determines each pixel as being black if $$L \leq Th1,$$

and determines the pixel as being white if $$L > Th1.$$

The sign Th1 represents a predetermined threshold value. Thus, the generating unit 1 determines a pixel having a lightness lower than the value Th1 as being black and determines the pixel having a lightness higher than the value as being white. The thus-determined color, black or white, is used as being a value carried by the two-tone signal for each pixel. Thus, the two-tone signal is generated.

This method is effective for a case in which a sheet having an original image to be checked is placed in a white background. That is, if the system is applied to a machine such as a duplicator and the duplicator has a glass on which the sheet, for example the business card having color letters printed thereon in this case, is to be placed. The duplicator further has a plate which has a white surface and is placed on the glass, so that the white surface faces the glass, after the sheet is placed on the glass. The above-mentioned glass has, for example, a size of the A3 size and the white surface has a size larger than the A3 size accordingly. The duplicator scans the sheet and the white surface of the plate, both having been placed on the glass. As a result, the pixels corresponding to the white surface are determined as being white and the pixels corresponding to the sheet, the business card in this example, are also determined as being white, but the color letters printed thereon are not determined as being white. Therefore, in all the relevant pixels, only the pixels corresponding to the color letters are used to extract the circumscribing rectangles through the step S102 shown in FIG. 2. The pixels corresponding to the white surface are removed from those to be used to extract the circumscribing rectangles and thus the object extraction operation is simplified and can be performed efficiently. The above-mentioned value Th1 should be determined so that the white surface of the plate and the white background of the business card is to be determined as being white and the color letters printed on the business card are to be determined as being black.

An object extraction system in a third embodiment of an object extraction method and apparatus according to the present invention will now be described. Differences between the object extraction system in the third embodiment and that in the second embodiment will now be described.

The two-tone image signal generating unit 1 in the third embodiment determines each pixel as being black if L≧Th2, and determines the pixel as being white if L<Th2.

The sign Th2 represents a predetermined threshold value. Thus, the generating unit 1 determines a pixel having a lightness higher than the value Th2 as being black and determines the pixel having a lightness lower than the value as being white. The thus-determined color, black or white, is used as being a value carried by the two-tone signal for each pixel. Thus, the two-tone signal is generated.

This method is effective for a case in which a sheet having an original image to be checked is placed in a white background. That is, if the system is applied to a machine such as a duplicator and the duplicator has a glass on which the sheet, for example the business card having color letters printed thereon in this case, is to be placed. The duplicator further has a plate which has a silver surface and is placed on the glass, so that the silver surface faces the glass, after the sheet is placed on the glass. The term 'silver' means a state of the surface of the plate such that the pixels obtained from the surface have the reflectance values being very black. That is, the corresponding lightness value L is very low and thus, the silver surface is determined as being white (L<Th2). The duplicator scans the sheet and the silver surface of the plate, both having been placed on the glass. As a result, the pixels corresponding to the silver surface are determined as being white (L<Th2) and the pixels corresponding to white background of the sheet, the business card in this example, are determined as being black (L≧Th2). Therefore, in all the relevant pixels, only the pixels corresponding to the white background of the business card are used in the extraction of the circumscribing rectangles through the step S102 shown in FIG. 2. The pixels corresponding to the silver surface are removed from those to be used in the extraction of the circumscribing rectangles and thus the object extraction operation is simplified and can be performed efficiently. The above-mentioned value Th2 should be determined so that the silver surface of the plate is to be determined as being white (L<Th2) and the white background of the business card is to be determined as being black (L≧Th2).

Except for this point, the two systems in the second and third embodiments are identical.

Further, the method of the system in the third embodiment is effective in a case in which the sheet to be checked is placed on the glass of the duplicator and no plate is placed on the glass, that is, only the sheet is placed on the glass. The duplicator scans the sheet having been placed on the glass and an open space present on and above the glass. As a result, the pixels corresponding to the open space are determined as being white (L<Th2) and the pixels corresponding to white background of the sheet, the business card in this example, are determined as being black (L≧Th2). Thus, the condition is similar to that in the case in which the silver surface of the plate is used as described above.

An object extraction system in a fourth embodiment of an object extraction method and apparatus according to the present invention will be described with reference to FIG. 5. Differences between the system in the fourth embodiment and the systems in the second and third embodiments will now be described.

Figure 5:
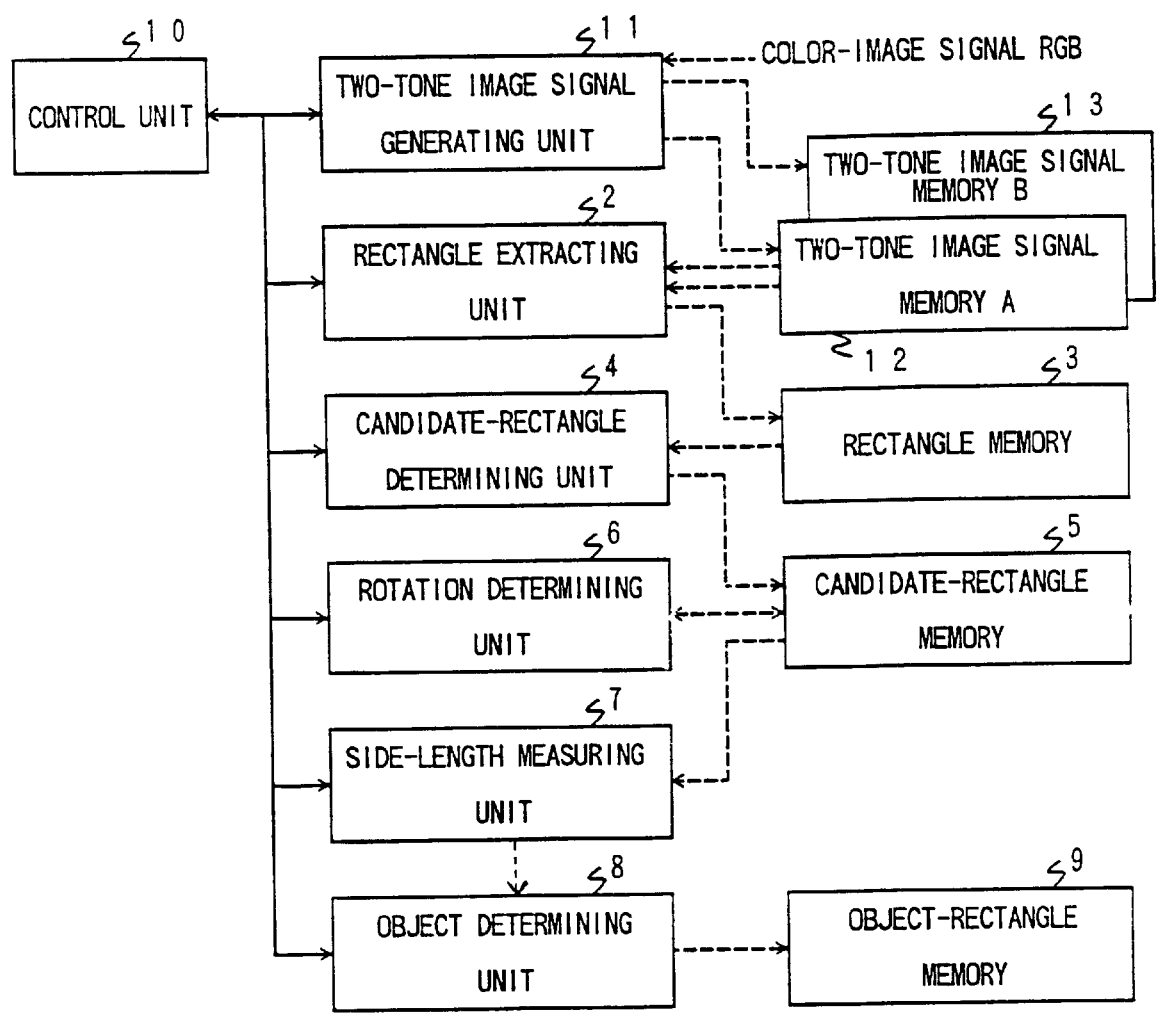
FIG. 5 show a block diagrams of an object extraction system in second, third and fourth embodiments of object extraction method and apparatus according to the present invention.

Differently from each of the systems of the second and third embodiments, the system in the fourth embodiment has the two-tone image signal generating unit 11, a two-tone image signal memory A and a two-tone image signal memory B, as shown in FIG. 5. The two-tone image signal generating unit 11 performs both a first operation, identical to one which the two-tone image signal generating unit 1 in the system in the second embodiment performs, and a second operation, identical to one which the two-tone image signal generating unit 1 in the system in the third embodiment performs. The two-tone image signal obtained from the above-mentioned first operation is stored in the two-tone image signal memory A, 12 and the two-tone image signal obtained from the above-mentioned second operation is stored in the two-tone image signal memory B, 13.

The rectangle extracting unit 2 extracts the circumscribing rectangles using the two-tone image signal stored in the memory 12, the thus-extracted circumscribing rectangles being referred to as first rectangles. Further, the rectangle extracting unit 2 extracts the circumscribing rectangles also using the two-tone image signal stored in the memory 13, the thus extracted circumscribing rectangles being referred to as second rectangles. The candidate-rectangle determining unit 4 performs the step S103 shown in FIG. 2 so as to determine for each rectangle of the first and second rectangles whether or not the rectangle has dimensions matching the first preset extents for the object, respectively. As a result, a rectangle among the above-mentioned first rectangles may be determined to have dimensions included in the first preset extents respectively for the object and it will be referred to as a first rectangle. Similarly, a rectangle among the above-mentioned second rectangles may be determined to have dimensions included in the first preset extents respectively for the object and it will be referred to as a second rectangle.

The candidate-rectangle determining unit 4 then determines whether or not the first rectangle completely geometrically includes the second rectangle or vice versa or whether no such inclusion is present in the rectangles. If such inclusion is present, only one rectangle which completely includes the other rectangle is stored in the rectangle memory 3 and the other rectangle completely included in the rectangle, having been stored in the memory 3 as mentioned above, is removed from further determination. If, for example, the above-mentioned second rectangle is geometrically completely included in the first rectangle, only the first rectangle is stored in the memory 3 and will be further determined. Such geometrical determination can eliminate redundancy which results from performing further determination on the two rectangles if, one geometrically completely includes the other.

The above-described operation will now be described using the above-mentioned example using the business card as the input image to be checked in the object extraction system. If the duplicator having the plate with the white surface is used as the plate to be placed on the glass, the white surface of the plate is determined as being white in the two-tone image generating unit 11 in the first operation according to the method of the system in the second embodiment. Further, the white background of the card, placed on the glass at the same time, is determined as being white and the color letters are determined as being black. As a result, the first circumscribing rectangles obtained from the two-tone image signal is a rectangle representing the color letters. On the other hand, in the second operation according to the method of the system in the third embodiment, the two-tone image generating unit 11 provides the two-tone image signal in which the white surface of the plate and the white background of the business card are determined as being black (L≧Th2). As a result, the second circumscribing rectangle obtained from the two-tone image signal is a rectangle representing the white surface of the plate which has dimensions, for example, of a size larger than the A3 size, as mentioned above. On the other hand, the first rectangle having the dimensions of the business card, for example, 9 cm×5.5 cm. The thus-obtained second rectangle has a very large area in comparison to the first rectangle. If the object to be extracted is a business card such as that placed on the glass of the duplicator as mentioned above, the above-mentioned first preset extents (in dimensions) for the object thus are those including the dimensions of the business card, respectively, accordingly. Since the dimensions of the A3 size are very large in comparison to those of the business card, the second rectangle will not be determined to have dimensions included in the first preset extents respectively for the object in the step S103. As a result, only the first rectangle will be determined to have the dimensions included in the first preset extents respectively for the object, and thus will be stored in the rectangle memory 3, and further determination will be performed on the thus-stored rectangle.

In this example, if the operator does not use the plate and thus the plate is not placed on the glass, the duplicator scans the open space present on and above the glass and thus it is determined as being black according to the method of the second embodiment. Further, the color letters printed on the business card are also determined as being black. Thus, the first circumscribing rectangles is those representing the open space and the color letters of the business card. On the other hand, in the two-tone image signal obtained in accordance with the method according to the third embodiment, the open space is determined as being white and the white background of the business card is determined as being black. Thus, the second circumscribing rectangle is that representing the business card. Thus, the three circumscribing rectangles are obtained, first one for the open space on and above the glass, second one for the color letters of the card and third one for the business card. As mentioned above, the candidate-rectangle determining unit 4 determines that each of the second one for the color letters of the card and the third one for the business card among the three circumscribing rectangles are included in the first preset extents respectively for the object. This is because the circumscribing rectangle for the open space has dimensions similar to the white surface of the plate and very large in comparison to the those of the business card. Further, the circumscribing rectangle for the color letters of the card has dimensions relatively close to those of the business card since, generally speaking, an overall outline of a set of letters printed on the business card has a major area in the entire area of the business card. As mentioned above, the candidate-rectangle determining unit 4 then determines the geometric inclusion of the thus-obtained two rectangles, the above-mentioned second one for the letters and third one for the card. Since the card geometrically completely included the letters, the third circumscribing rectangle for the card is selected to be stored in the rectangle memory 3, and further determination will be performed on the thus-stored rectangle.

The second preset extents (in dimensions, long-side dimension and short-side dimension as mentioned above) for the object used in the step S108 of FIG. 2 as the reference data preferably include two kinds of extents, first kind thereof for the image part representing the object obtained by the method according to the second embodiment and second kind thereof for the image part representing the object obtained by the method according to the third embodiment. These two kinds of extents are, in the above-described example, one kind thereof for the business card and the other kind thereof for the letters printed for the business card. Thus, the step S108 can accurately perform the above-mentioned relevant operation using an appropriate kind of second preset extents of the above-mentioned first kind thereof and second kind thereof. That is, if the circumscribing rectangle obtained as a result of the method according to the second embodiment is provided to the step S108, the first kind of the second preset extents for the object are used in the step S108, and if the circumscribing rectangle obtained as a result of the method according to the third embodiment is provided to the step S108, the second kind of the second preset extents for the object are used in the step S108.

Thus, the above-described object extraction system in the fourth embodiment can flexibly process the image data, for various cases, for example, not only the above-mentioned case in which the plate with the white surface is used to be placed on the glass on which a sheet, such as a business card was placed on, but also the above-mentioned case where the plate is not used so that the image is scanned while the open space is present on and above the glass.

Except for the above-described point, the system in the fourth embodiment is identical to each of the systems in the second and third embodiments.

Further, it is also possible that a piece of photograph is used as the above-mentioned object to be extracted through the present object extraction system, instead of using a business card for the same purpose as described above. In general, a piece of photograph has a white border portion in the periphery of a picture portion. Ordinarily, the picture portion has a density higher than that of the white border portion, that is, the picture portion has a lightness lower than that of the white border portion. Further, an outline of each portion of the picture portion and border portion has a rectangular shape and the rectangular outline of the border portion completely geometrically includes the rectangular outline of the picture portion. In such a case, if the two-tone image signal is generated due to the above-described method according to the second embodiment, the rectangular outline of the picture portion is extracted as the circumscribing rectangle in S102. If the two-tone image signal is generated due to the above-described method according to the third embodiment, the rectangular outline of the border portion is extracted as the circumscribing rectangle in S102. Since the rectangular outline of the border portion geometrically completely includes the rectangular outline of the picture portion, only the circumscribing rectangle extracted for the border portion is stored in the rectangle memory 3, but the circumscribing rectangle extracted for the picture portion is not stored therein.

Figure 6:
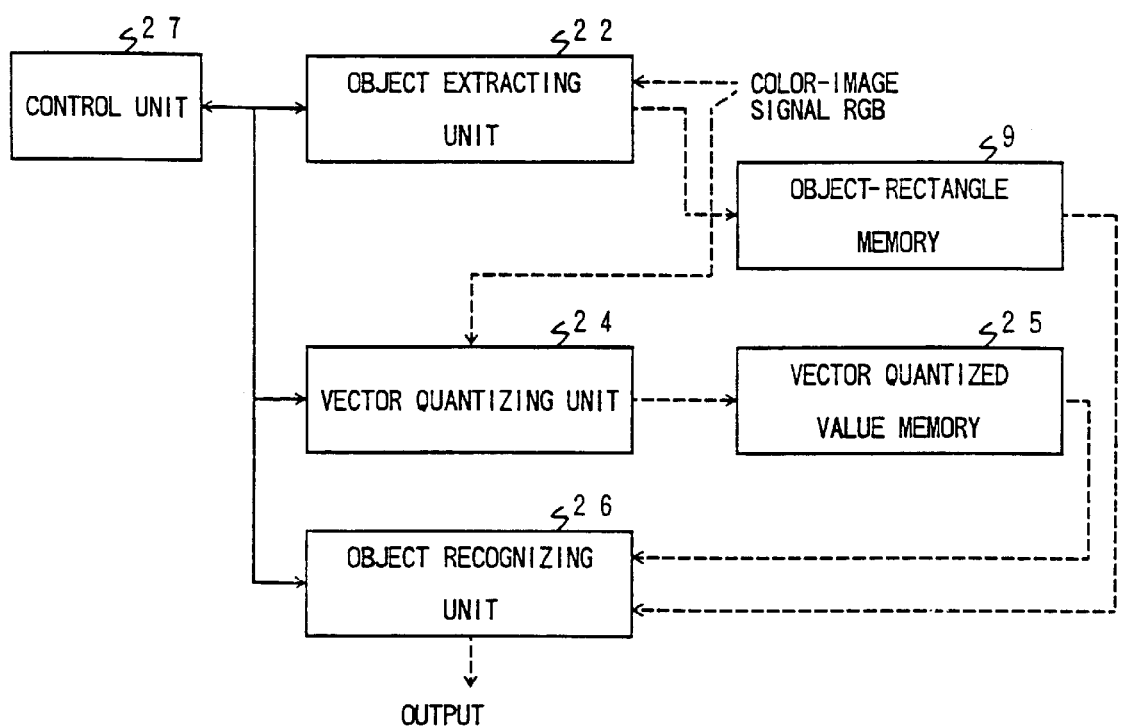
FIGS. 6 and 7 show block diagrams of an object extraction and recognition system in a fifth embodiment of object extraction method and apparatus and image recognition method and apparatus according to the present invention.

With reference to FIG. 6, an object extraction and recognition system in a fifth embodiment of an object extraction method and apparatus and object recognition method and apparatus according to the present invention will now be described. Functions of the object extracting unit 22 includes those of the two-tone image signal generating unit 11, two-tone image signal memories A and B, 12 and 13, rectangle extracting unit 2, rectangle memory 3, rotation determining unit 6, candidate-rectangle memory 5, side-length measuring unit 7, and object determining unit 8 shown in FIG. 5. Further, the object-rectangle memory 9 is identical to that shown in FIG. 5.

A vector quantizing unit 24 performs a vector quantizing operation, described later, on the color-image signal. The color-image signal is a signal which is input to the system shown in FIG. 6 and processed in the object extracting unit 22. Thus, the data of the outline of the image part corresponding to the above-mentioned object, as described above with reference to FIG. 5, is extracted and stored in the object-rectangle memory 9. Values obtained as a result of performing the vector quantizing operation on the color-image signal are stored in a vector quantized value memory 25. An object recognizing unit 26 uses the values, stored in the vector quantized value memory 25 as mentioned above and also uses data representing the outline of the relevant image part, stored in object-rectangle memory 9 as mentioned above with reference to FIGS. 1 and 5. Using the values and data, the object recognizing unit 26 selects values among the values stored in the vector quantized values memory 25 using the data sto-ed in the object rectangle memory 9. In the object extraction and recognition system in the fifth embodiment of the present invention, the above-mentioned object, to be extracted from the input image and recognize the thus-extracted one as the object, includes a plurality of objects. The object recognizing unit 26 determines which object of the above-mentioned plurality of objects the currently processed image part is relevant, as described later. This recognizing operation is performed by comparing the values, selected from among the memory 25 as mentioned above, with values, which values are previously produced dictionary information described later. Thus, the unit 26 determines whether or not the image data having the outline stored in the object-rectangle memory 9 corresponds to the above-mentioned object. A control unit 27 overall controls the other units shown in FIG. 6.

Figure 7:
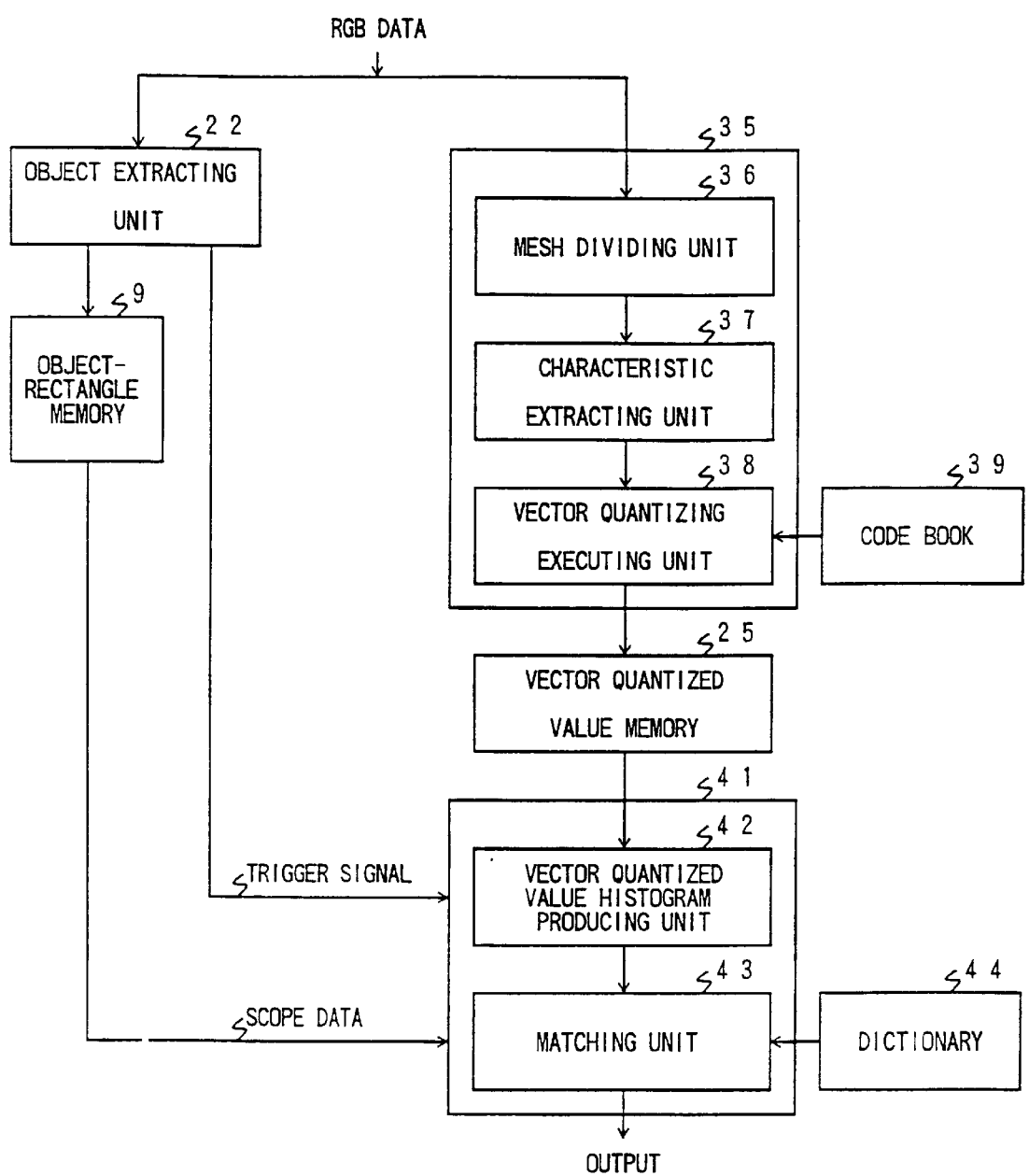
Figure 11A:
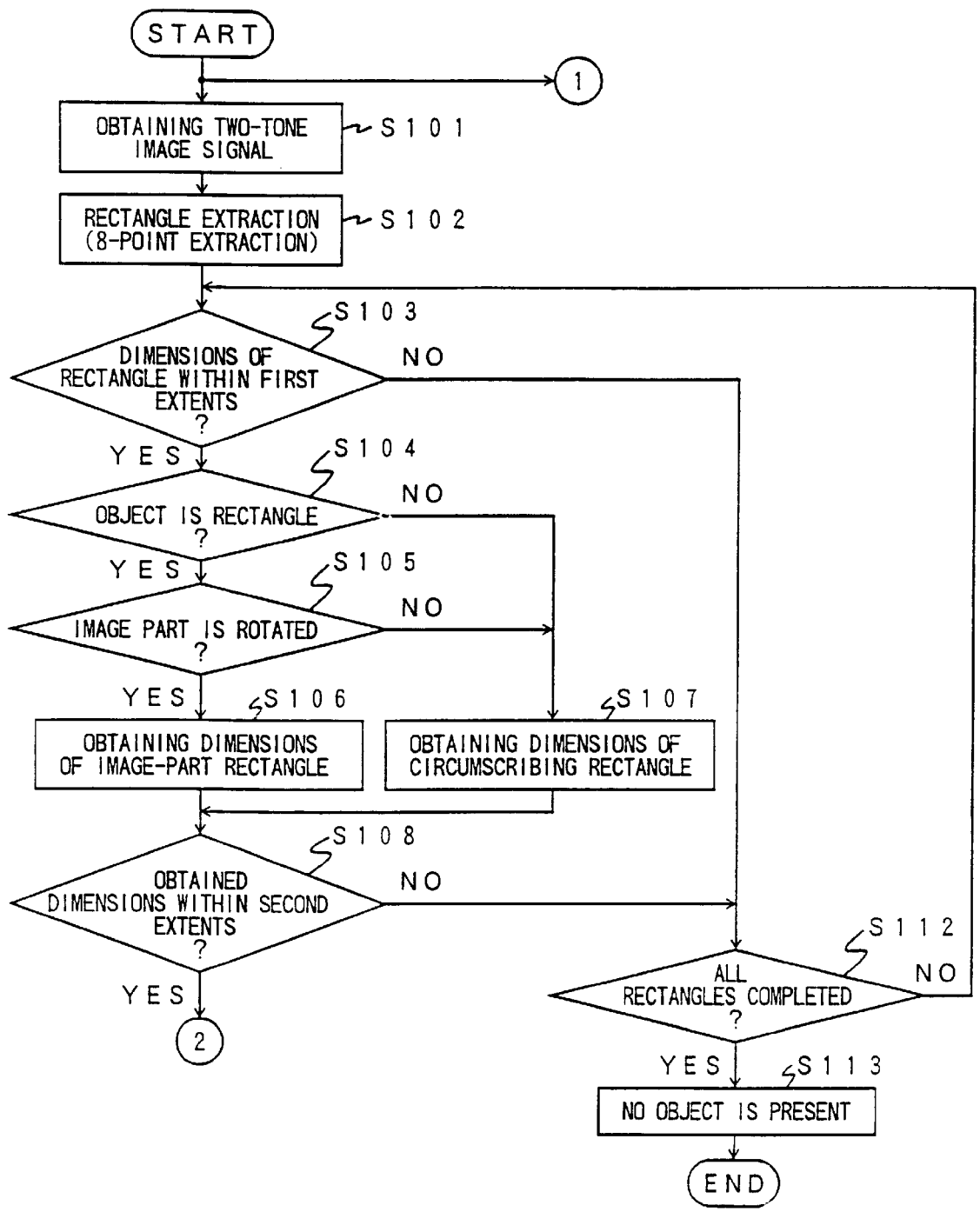
FIGS. 11A and 11B shows an operation flow of the system shown in FIGS. 6 and 7.
Figure 11B:
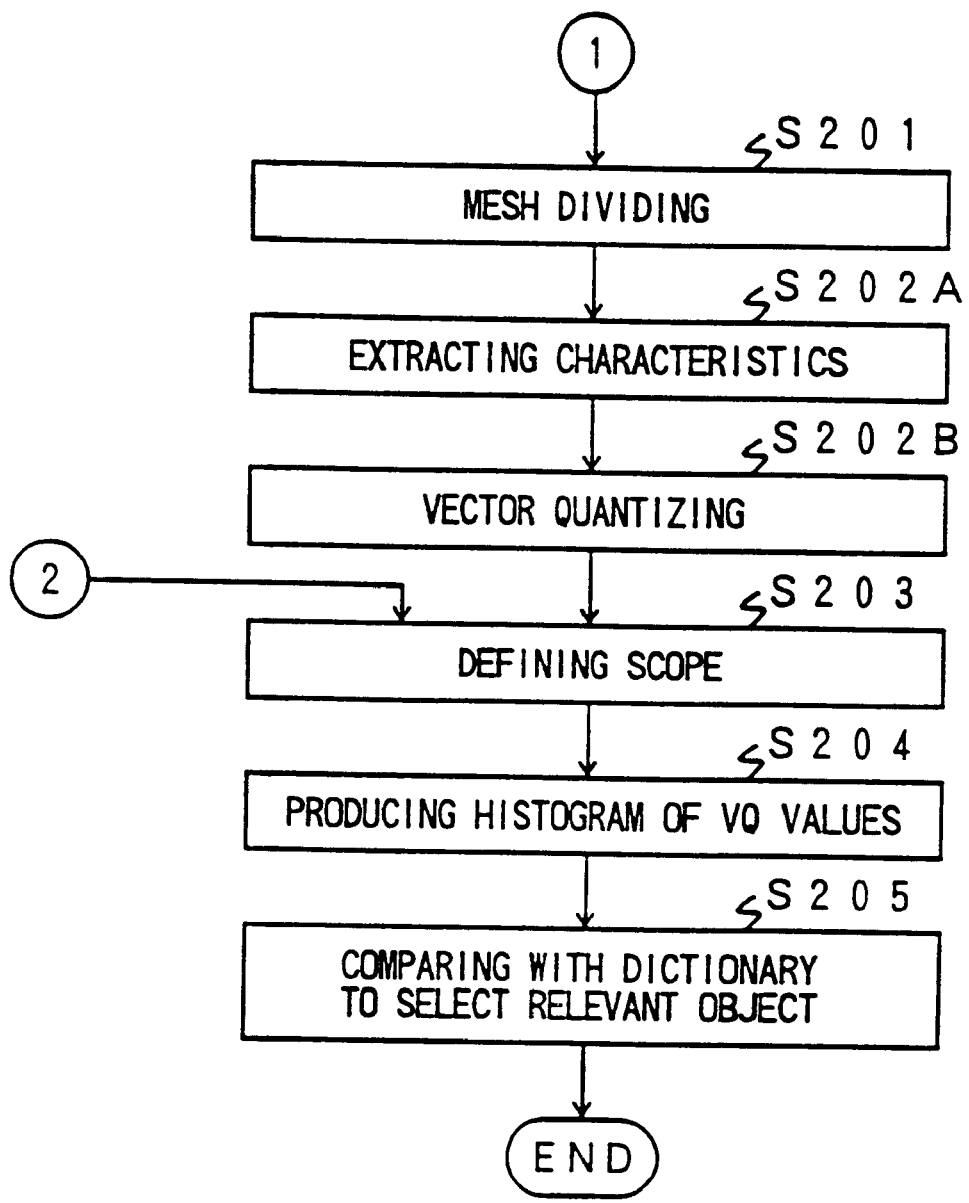

With reference to FIG. 7 and FIGS. 11A and 11B, details of the object extraction and recognition system in the fifth embodiment will now be described. As mentioned above, the object extracting unit 22 and the object-rectangle memory 9 have functions identical to those of the object extraction system shown in FIG. 5. In addition to the functions identical to those of the system shown in FIG. 5, the object extracting unit 22 has a function to provide a trigger signal. The above-mentioned trigger signal indicates a timing at which the object extracting unit 22 receives data, which data is included in data carried by the above-mentioned color-image signal, and represents a certain one of the image parts. The certain one of the image part is an image part for which the object extracting unit 22 has extracted the circumscribing rectangle and also has determined that the thus extracted circumscribing rectangle as corresponding to the object as described above through the step S115 shown in FIG. 2. After the object extracting unit 22 receives the above-mentioned data, the object-rectangle memory 9 provides scope data consisting of the data representing the outline of the relevant image part in the memory 9. The vector quantizing unit 24 consists of a vector quantizing processing unit 35 and a memory 39 named code book, described later, shown in FIG. 7. The object recognizing unit 26 consists of an object recognizing processing unit 41 and a memory 44 named dictionary, described later, shown in FIG. 7. The above-mentioned trigger signal and scope data are provided to the vector recognizing processing unit 41.

The vector quantizing processing unit 35 includes a mesh dividing unit 36, a characteristic extracting unit 37, and a vector quantizing executing unit 38. The mesh dividing unit 36, in a step S201 shown in FIG. 11B, divides the color image carried by the color-image signal (consisting of R, G, and B signals) into small regions. Such dividing is performed as if a mesh (grid) is placed on the image. The characteristic extracting unit 37, in a step S202A of FIG. 11B, obtains an amount representing characteristics of each region of the thus-divided small regions. As described later, the amount representing characteristics consists of a chromaticity histogram. The vector quantizing executing unit 38, in a step S202B of FIG. 11B, compares the thus-extracted amounts with information previously produced and stored in the code book 39. By the comparison, the unit 38 performs the vector quantizing operation in the step S202B. Data is obtained as a result of the vector quantizing operation performed on the amounts representing characteristics of the small regions of the color image data. The thus-obtained data is stored in the vector quantized value memory 25 and may be referred to as 'vector quantized values', hereinafter. All of data carried by the color-image signal input to the object extraction and recognition system shown in FIG. 6 is processed by the vector quantizing unit 24.

Figure 8:
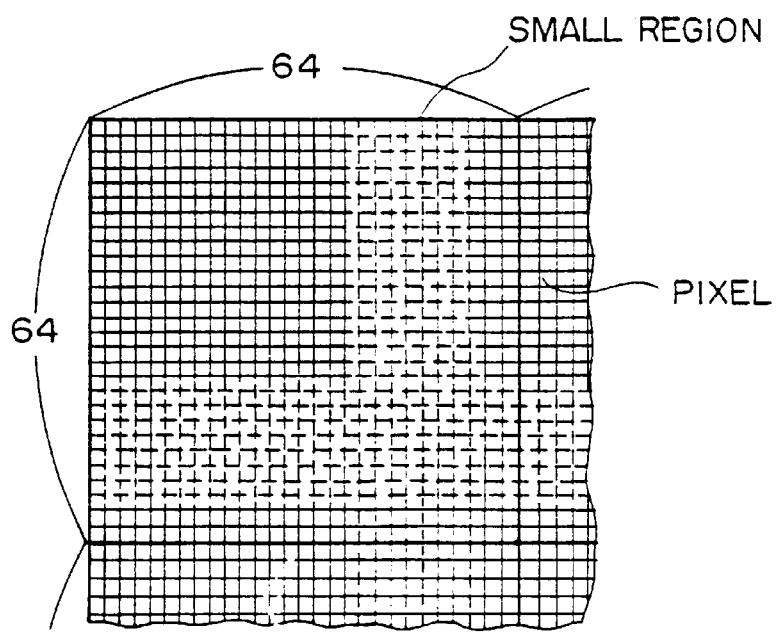
FIG. 8 illustrates a method of dividing an input image part into small regions, the method being performed by a mesh dividing unit in the system shown in FIG. 7.
Figure 16:
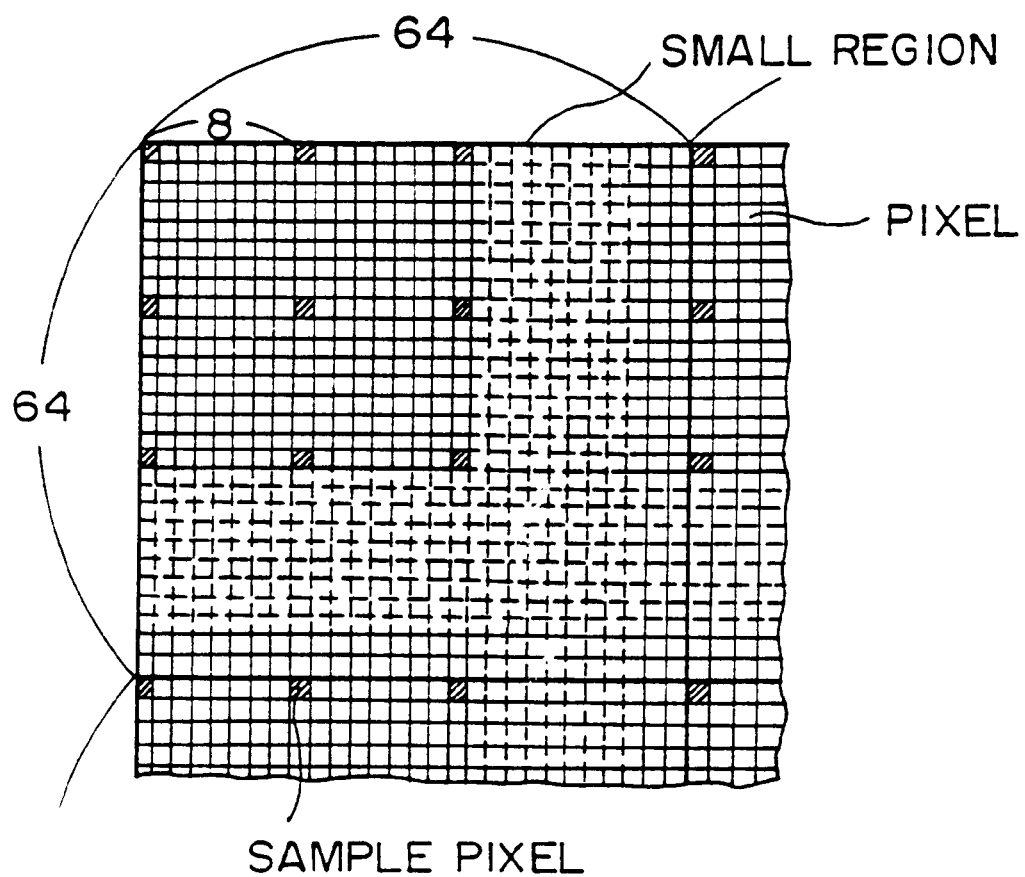
FIG. 16 illustrates a pixel selecting operation which is a feature of a color image recognition system in a seventh embodiment of color image recognition method and apparatus according to the present invention.

How to perform the vector quantizing operation will now be described. FIG. 8 shows a corner of the above-mentioned color image. A finer grid shown in FIG. 8 indicates pixels of pixels constituting the relevant color images. A coarser grid indicates the small regions divided by the mesh dividing unit 36. In the example, each small region of the small regions consists of 64 pixels×64 pixels. (In FIG. 8, indication of 64 pixels×64 pixels for the small region is omitted, but 28 pixels and 28 pixels are indicated therefor, for the sake of simplification of the drawing.) The mesh dividing unit 36 divides the small regions as described above and obtains image data of the 64 pixels×64 pixels for each small region to be processed by the characteristic extracting unit 37. However, it is possible to reduce the number of pixels of the image data to be processed by the unit 37. Specifically, for example, as shown in FIG. 16, pixels are sampled from the 64 pixels×64 pixels so that 7 pixels, along each of the vertical and horizontal directions, are left between each two pixels to be sampled. Thus, the number of pixels to be sampled is a number of ⅛×⅛ the 64×64, that is, 64·⅛×64·⅛, for each small region. Image data of the thus-reduced number of pixels, that is, the thus compressed image data, may be processed by the characteristic extracting unit 37.

The characteristic extracting unit 37 obtains chromaticities Pr and Pg by the following equations (1) and (2) for each pixel using color image values R, G and B, carried by the above-mentioned color-image signal and each value of R, G and B consisting of data of 8 bit:

$$Pr=256 \cdot R/(R+G+B) \qquad (1),$$

and $$Pg=256 \cdot G/(R+G+B) \qquad (2).$$

The thus-obtained chromaticities Pr and Pg of the pixels have only information of tone of colors and does not have information dependent of a matter, for example, as to how strong a sheet having the color image printed thereon is illuminated, the color image being scanned to obtain the color-image signal. Thus, accurate object recognition can be achieved by using the chromaticities Pr and Pg without being adversely affected by, for example, the above-mentioned illumination. If object (image) recognition is made using image data depending on the illumination, adverse affection may occur in the following situation, for example:

It is assumed that the image data is obtained as a result of scanning a book placed on a glass of a duplicator, while certain two pages of the book are opened and face the glass, the image scanning being made through the glass. In the scanning, first light is illuminated on the opened pages. If the book is thick, that is, if the book has a large number of pages, and the above-mentioned two pages are opened on the glass, parts of the two pages adjoining with each other at a binding part of the book may not come into contact with the glass and thus may be left without being sufficiently illuminated. According to the present embodiment of the present invention, even if some part in the relevant image are left without being sufficiently illuminated, such a matter does not adversely affect the object recognition result.

In fact, since the chromaticities Pr and Pg are obtained through the above-mentioned equations (1) and (2), obtaining a ratio of the signal R or G to the sum of the signals R, G and B, a component of the intensity, which intensity each of the signals R, G and B has, is eliminated and only the ratios are obtained. Further, as a result of multiplying the thus-obtained ratios by 256 in the equations (1) and (2), each of the chromaticities Pr and Pg can be expressed by 8 bits.

Using the chromaticities Pr and Pg of the pixels, a histogram of the chromaticities Pr is obtained for each small region of the small regions. Further, a histogram of the chromaticities Pg is obtained for each small region of the small regions. Thus, each small region has the histogram of the chromaticities Pr and that of the chromaticities Pg. The present invention does not limit the vector quantizing operation to use the chromaticities Pr and Pg. Instead of this, Pb (=256·B/(R+G+B)) may be used and also, instead of use of such chromaticities, other color characteristics such as hue or saturation may be used.

Figure 9:
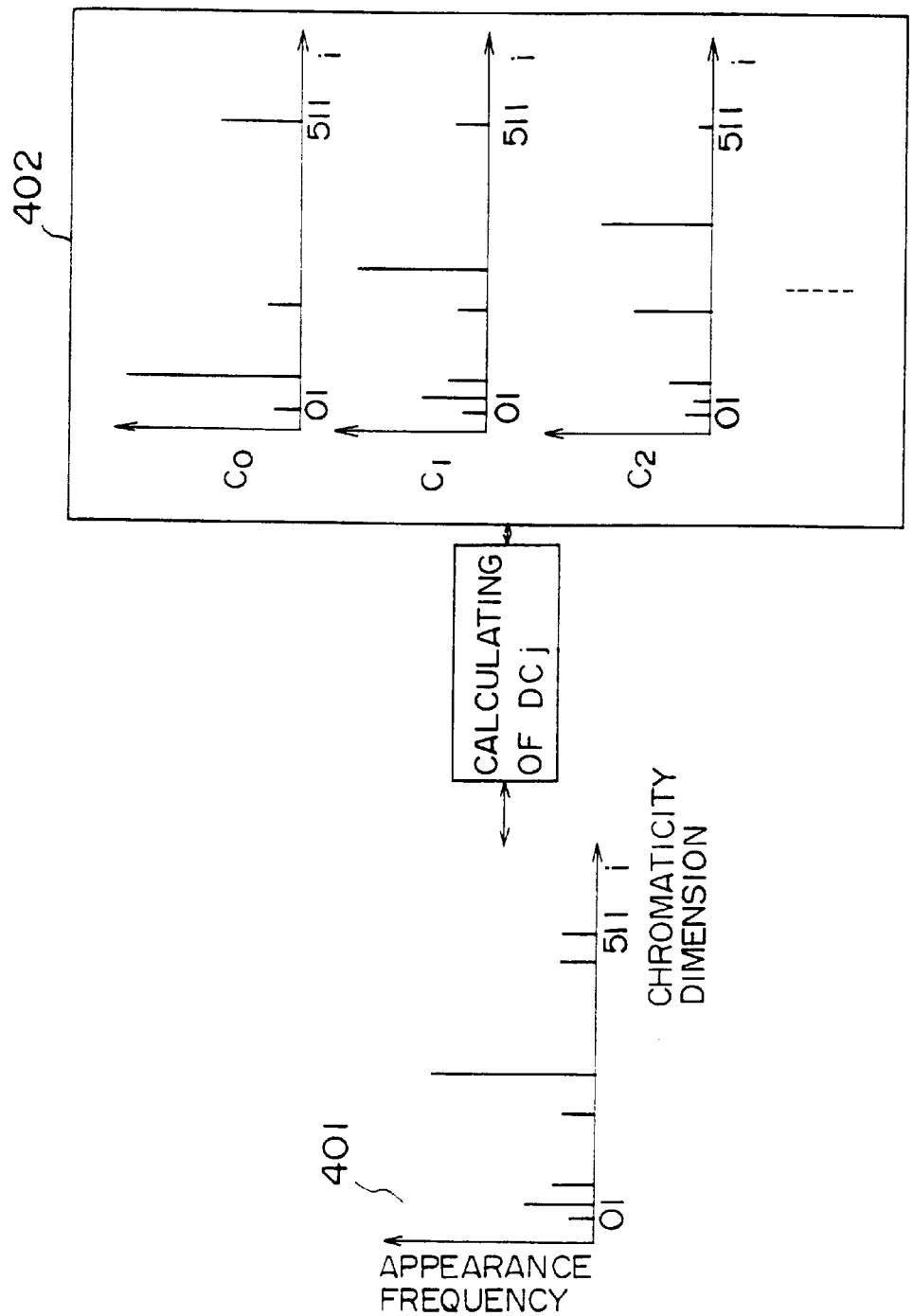

A histogram 401 shown in FIG. 9 is a histogram consisting of the histogram of the chromaticities Pg and that of the chromaticities Pr. The horizontal axis shows 512 chromaticities (i=0 through 511), being referred to as 'chromaticity dimensions', hereinafter. Among the 512 chromaticity dimensions, the first 256 chromaticity dimensions (i=0 through 255) are a chromaticity range for the chromaticities Pr and the remaining 256 chromaticity dimensions (i=256 through 511) are a chromaticity range for those Pg. The chromaticities Pr 0 through 255 corresponds to the chromaticity dimensions (i=0 through 255), respectively. The chromaticities Pg 0 through 255 corresponds to the chromaticity dimensions (i=256 through 511), respectively. Among the 256 chromaticity dimensions for the chromaticities Pr, the chromaticity Pr of each pixel included in each small region may corresponds to one. Among the 256 chromaticity dimensions (i=256 through 511) the chromaticity Pg of each pixel included in each small region may corresponds to one.

The horizontal axis is thus an axis of the chromaticity dimensions. The vertical axis of the histogram 401 of FIG. 9 shows an appearance frequency for each chromaticity dimension of the total 512 (=256+256) chromaticity dimensions (i=0 through 511). That is, a height of a bar at each chromaticity dimension in the histogram produced for the small region indicates how many pixels having the relevant chromaticity are present in the relevant small region. Therefore, each chromaticity histogram 401 represents a vector having 512 dimensions, each dimension having a magnitude consisting of the appearance frequency.

Code book information 402 shown in FIG. 9 is information stored in the code book 39 shown in FIG. 7. The code book information consists of a plurality of the chromaticity histograms $C_0, C_1, C_2, \ldots$ shown in FIG. 9. How to produce the histograms is substantially the same as how to produce the histogram 401 shown in FIG. 9. However, the chromaticity histograms as the code book information are those obtained from the small regions of many color images including one of the above-mentioned object. The above-mentioned object is an object which the object extraction and recognition system shown in FIG. 6 attempts to extract from the color image being input thereto. The histograms of the code book information preferably include those obtained from the small regions of color images other then those of the above-mentioned object. The reason for including the chromaticity histograms from the small regions of the other images will now be described. By having data of many kinds of images, it is possible to change the above-mentioned object from the image part currently used as the object to another image among those which the code book information includes. Further, by use of data of many kinds of images other than the above-mentioned object, it is possible to determine the currently processed image part as being an image part included in the code book information but not correspond to the above-mentioned object. Such a determination is effective in a case where there is a large possibility of appearing of an image part similar to but not corresponding to the above-mentioned object. By having such similar but not corresponding image part in the code book information, it is possible to determine such a similar image part not to correspond to the above-mentioned object.

In practice, a very large number of images are used to produce the very large number of chromaticity histograms in the same manner. The code book information is produced by clustering the thus-produced histograms so as to obtain typical chromaticity histograms as the code book information. By such clustering, it is possible to effectively reduce the number of histograms to be used as the code book information so that the capacity of the memory of code book can be made small and also time required to for the process using the code book information can be shortened.

The vector quantizing executing unit 38 obtains a difference for each chromaticity dimension among those (i=0 through 511) between the appearance frequency in the histogram 401 and that in each of the histograms of the code book information 402. Using the differences, which are thus obtained for each histogram of the histograms of code book information, as a distance DCj between the relevant histogram 401 and each one of the histograms of the code book information 402 is obtained by, :or example, the following equation (4):

$$DCj = \sum_{i=0}^{511} (Hi - Cji)^2. \tag{1}$$

The above sign 'Hi' is referred to the appearance frequency at the chromaticity dimension 'i' of the histogram 401. The above sign 'Cji' is referred to the appearance frequency at the chromaticity dimension 'i' of the histogram Cj included in the code book information 402. As shown in the above equation (4), each difference (Hi-Cj) may be squared and summed for i=0 through 511. Thus, the above-mentioned distarce DCj is obtained. A method of obtaining the above-mentioned distance between the relevant histogram 401 and each one of the histograms of the code book information 402 is not limited to this method. Various methods are known and may be used for the same purpose. Using the distances thus-obtained for the histograms constituting the code book information 402, the vector quantizing executing unit 38 determines a chromaticity histogram Cj from among those constituting the code book information 402. The histogram to be determined as mentioned above is a chromaticity histogram Cj having the minimum distance from the histogram 401 obtained from the relevant small region. The vector quantizing executing unit 38 stores the number j of the thus-determined histogram Cj in the vector quantized memory 40. The number j thus stored for each small region is referred to as a 'vector quantized values' or a 'VQ value', the small region being one among the small regions constituting the color image represented by the input color-image signal. The VQ values are stored in the vector quantized value memory 25 shown in FIG. 7.

The object recognizing processing unit 41 includes a vector quantized value histogram producing unit 42 and a matching unit 43. The histogram producing unit 42 uses the above-mentioned vector quantized values of ones among the above-mentioned small regions and thus produces a histogram. FIG. 10 shows an example of the input color image which is divided as the 9×11 small regions through the mesh dividing unit 36 of FIG. 7. A numeral shown in each small region in FIG. 10 is the relevant VQ value. The histogram of the vector quantized values will now be described. If, for example, the histogram is produced for all of the small regions shown in FIG. 10, $VQ_0=0$, $VQ_1=8$, $VQ_2=15$, $VQ_3=7$, $VQ_4=9$, $VQ_5=14$, $VQ_6=9$, $VQ_7=7$, $VQ_8=12$, $VQ_9=5$, . . . For example, '$VQ_2=15$' is obtained since the numeral '2' is present in FIG. 10 '15' times. That is, an appearance frequency for the VQ value 2 is 15.

Figure 12:
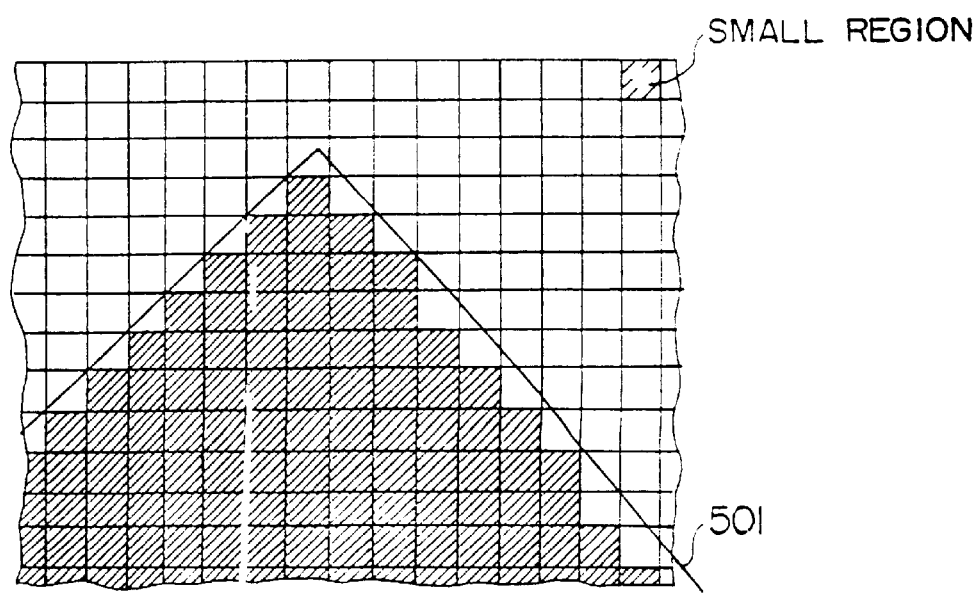
FIG. 12 illustrates a scope defining operation performed through a step S203 shown in FIG. 11B.

With reference to FIG. 11B, an operating flow of an operation performed through the object recognizing processing unit 41 shown in FIG. 7 will be described. As mentioned above, the object extracting unit 22 provides the trigger signal to the object recognizing processing unit 41 and the object-rectangle memory 9 provides the scope data to the same unit 41. Such operations are performed after the step S108 shown in FIG. 11A has provided the determination result YES for the currently processed image part and stores data of the outline of the image part in the object-rectangle memory 9. The steps S101, S102, S103, S104, S105, S106, S107, and S108 shown in FIG. 11A are substantially identical to those shown in FIG. 2. The scope data provided by the object-rectangle memory 9 consists of the data indicating the outline of the relevant image part. FIG. 12 shows an example of an edge of the color image processed in the system shown in FIG. 6. In FIG. 6, each square is the respective small region. The hatched small regions located in a lower part of FIG. 1 are small regions, among those constituting the input color image, each of the small regions being completely geometrically included in the outline 501 of the relevant image part. The histogram producing unit 42, in a step S203 shown in FIG. 11B, determines small regions completely geometrically included in the outline 501 using the above-mentioned scope data provided by the object-rectangle memory 9. The histogram producing unit 42 thus uses the VQ values determined for each small region of the small regions constituting the input color image. The VP values, such as those shown in FIG. 10, were stored in the vector quantized value memory 25 as mentioned above. Using the VQ values as mentioned above, in a step S204 shown in FIG. 11B, the histogram producing unit 42 produces the histogram of the vector quantized values such as those described above for the thus determined small regions completely geometrically included in the outline 501. If the step S105 shown in FIG. 11A determines that the relevant image part is not one obtained as a result of the object being rotated, the object-rectangle memory 9 provides the scope data indicating an outline of the circumscribing rectangle which was produced for the relevant image part through the step S102 such as the rectangle 202 shown in FIG. 3 or 301 shown in FIG. 4, instead of the outline of the relevant image part such as the rectangle 203 shown in FIG. 3 or 302 shown in FIG. 4. The histogram producing unit 42 uses the scope data indicating the outline of the circumscribing rectangle. Using the scope data, the histogram producing unit 42 determines small regions, among the small regions constituting the input color image, completely geometrically included in the outline indicated by the scope data. The unit 42 thus produces in the step S204 the histogram of the vector quantized values for the thus-determined small regions.

Figure 13:
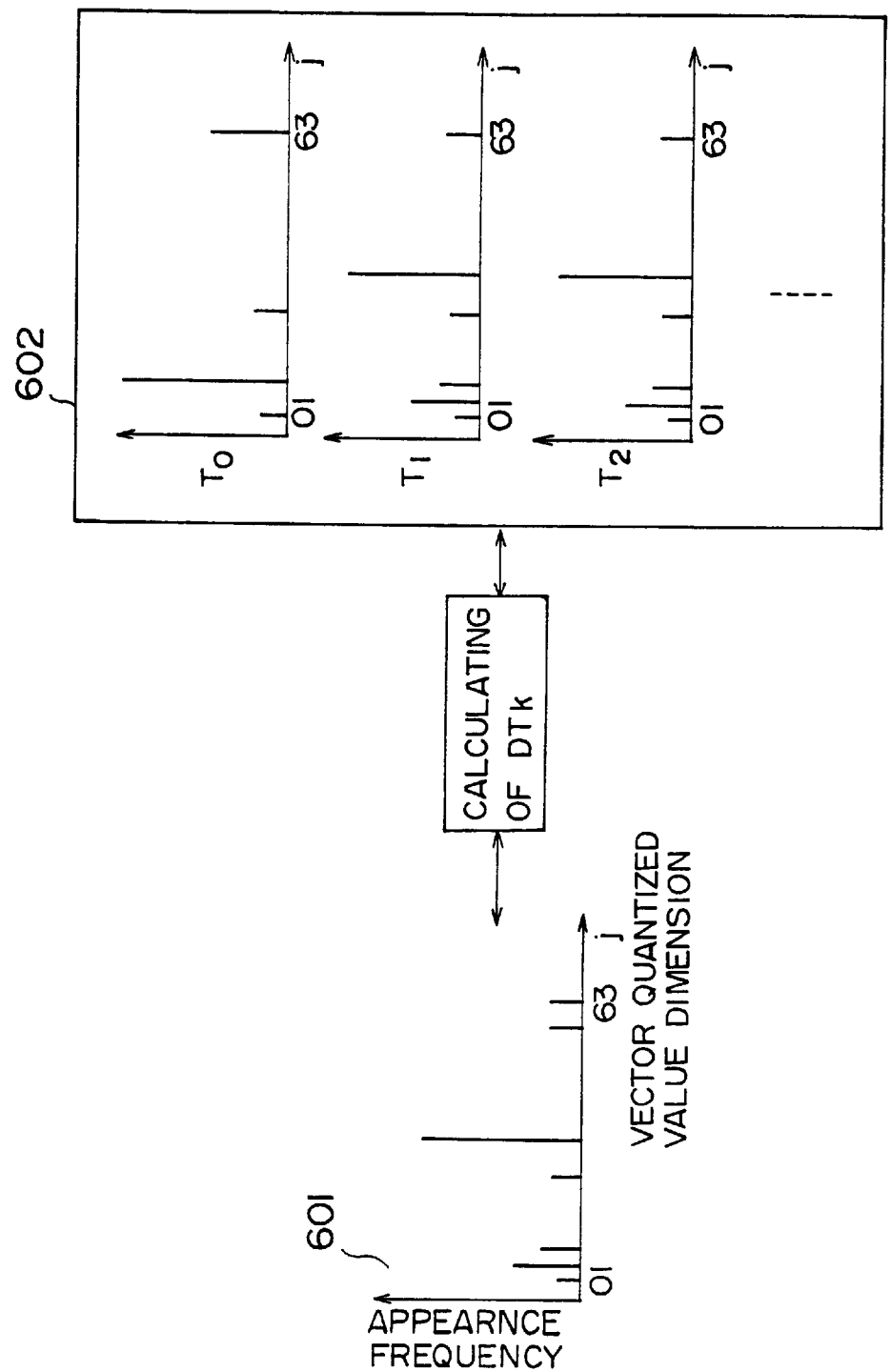
FIG. 13 shows an object identifying operation performed through a step S205 shown in FIG. 11B.

With reference to FIG. 13, a step S205 shown in FIG. 11B performed by the matching unit 43 will now be described. The step S205 compares the histogram of the vector quantized values obtained through the step S204 with each one of the histograms of the vector quantized values stored in the dictionary 44 shown in FIG. 7. A histogram of vector quantized values 601 is one example of that obtained for the relevant image part through the step S204 as described above. In this example, it is assumed that the code book information 402 shown in FIG. 9 has 64 chromaticity histogram Cj (j=0 through 63) and thus the VQ value is a value among 64 values, 0 through 63. In the histogram 601 shown in FIG. 13, the horizontal axis is an axis of vector quantized value dimensions for the above-mentioned 64 VQ values 0 through 63. The vertical axis is an axis of appearance frequencies, indicating how many times each one of the VQ values 0 through 63 appears in the above-mentioned small regions completely geometrically included in the outline of the relevant image part of the circumscribing rectangle. A height of each of the bars upward projecting from the respective vector quantized value dimension represents the relevant appearance frequency.

Histograms of vector quantized values $T_0$, $T_1$, $T_2$, . . . shown in FIG. 13 are those included in the above-mentioned dictionary information stored in the dictionary 44 shown in FIG. 7. As mentioned above, in the object extraction and recognition system in the fifth embodiment of the present invention, the above-mentioned object, to be extracted from the input image and recognize the thus-extracted one as the object, includes a plurality of objects. The above-mentioned histograms of vector quantized values $T_0$, $T_1$, $T_2$, . . . corresponds to the plurality of objects. Each of these histograms was previously produced in a manner and has a form the same as the manner and the form in which the histogram 601 shown in FIG. 13 is produced through the step S204.

The above-mentioned dictionary information may be produced in a manner similar to one in which the above-mentioned code book information is produced. That is, the histograms of vector quantized values constitute the dictionary information may include the histograms of vector quantized values obtained from not only the above-mentioned plurality of objects but also from clustering the histograms of vector quantized values obtained from many other images. Thus, advantages similar to the advantages obtained as a result of producing the code book information by the clustering of data obtained from the small regions of many images.

The matching unit 43 in the object recognizing processing unit 41 compares, in a step S205, the vector quantized value histogram 601 of the relevant image part with each of those constituting the dictionary information 602. Specifically, the matching unit 43 obtains a difference, in the appearance frequencies for each vector quantized value dimension, between the histogram 601 of the relevant image part and each of those of the dictionary information, similarly to obtaining the above-mentioned differences resulting in the above-mentioned distances DCj. Using the thus-obtained differences, distance DTk is obtained, as a result of the comparison of the histogram 601 and each of the histograms $T_0, T_1, T_2, \ldots$, in a manner similar to obtaining the above-mentioned distance DCj, by, for example, the following equation (5):

$$DTk = \sum_{j=0}^{63} (VQj - Tkj)^2. \quad (5)$$

The above sign 'VQj' is referred to the appearance frequency at the VQ value dimension 'j' of the histogram 601. The above sign 'Tkj' is referred to the appearance frequency at the VQ value dimension 'j' of the histogram Tk included in the dictionary information 602. Then, a histogram is selected from among the histograms $T_0, T_1, T_2, \ldots$, the thus-selected histogram being a histogram having the minimum distance DTk among those which the histograms of the dictionary information have. Thus, an object is determined, from among the above-mentioned plurality of objects (reference objects), as the object corresponding to the currently processed relevant image part. That is, the currently processed image part is identified to correspond to the thus-determined object among the plurality of objects.

If the step S103 provides the determination result NO, a step S112 determines whether or not all the image parts included in the input color image have been processed. If the determination result is NO, the step S103 is executed. Similarly, if the step S108 provides the determination result NO, a step S112 determines whether or not all the image parts included in the input color image have been processed. If the determination result is NO, the step S103 is executed. However, if the step S108 provides the determination result YES, the subsequent steps S204, and S205 are performed and the object extraction and recognition operation for the input color image is finished. If the step S112 provides the determination result YES, that is, if the step S108 determines the currently processed image part not to correspond to the above-mentioned object for all the image parts present in the input color image, a step S113 determines no image part corresponding to the above-mentioned object is present in the input color image. Then, the object extraction and recognition operation for the input color image is finished.

In the object extraction and recognition system in the fifth embodiment of the present invention, once the currently processed image part is determined to correspond to the object, the object extraction and recognition operation for the input color image is finished. However, the present invention does not limit an operation flow thereof to such an operation flow. It is also possible to all the image parts present in the input color image even if the step S108 determines a plurality of image parts to correspond to the above-mentioned object.

With reference to FIG. 7, the image data processing (the appropriate steps of the steps S101, S102, S103, S104, S105, S106, S107, S108, and S112 shown in FIG. 11A) through the object extracting unit 22 and object-rectangle memory 9 is performed in parallel with or simultaneously with the image data processing (the steps S201, S202A, S202B, S203, S204, and S205) through the vector quantizing processing unit 35, vector quantized value memory 25, and object recognizing processing unit 41, in the object extraction and recognition system in the fifth embodiment of the present invention. Further, with reference to FIG. 11A, the circumscribing rectangle is extracted from the input color image, the thus-extracted rectangle then undergoes the size determination process (steps S103 and S108), the image part of the rectangle, which has been determined to correspond to the above-mentioned object through the size determination, then undergoes the recognition process (step S205), one by one for the image parts included in the input color image. Thus, it is possible to achieve real-time data processing. As a result, the object extraction and recognition operation can be performed accurately at high speed. Further, using the vector quantizing technique in the object recognition process enables effective compression of data amount being processed using full information associated with the image part to undergo the object recognition process. Specifically, for example, it is possible to reduce a scale of the dictionary 44.

A color image recognition system in a sixth embodiment of a color image recognition method and apparatus according to the present invention will now be described with reference to FIGS. 14 and 15. The structure of the color image recognition system in the sixth embodiment is similar to that of the object extraction and recognition system in the fifth embodiment shown in FIGS. 6 and 7. However, differently from the structure of the system shown in FIGS. 6 and 7, the image recognition system in the sixth embodiment shown in FIG. 14 does not include a function performing the above-described object extraction operation shown in FIG. 11A. Elements of the system shown in FIG. 14 substantially identical to those of the system shown in FIGS. 6 and 7 have the same reference numerals as those of the corresponding elements of the system shown in FIGS. 6 and 7, description of these element being thus omitted.

Figure 14:
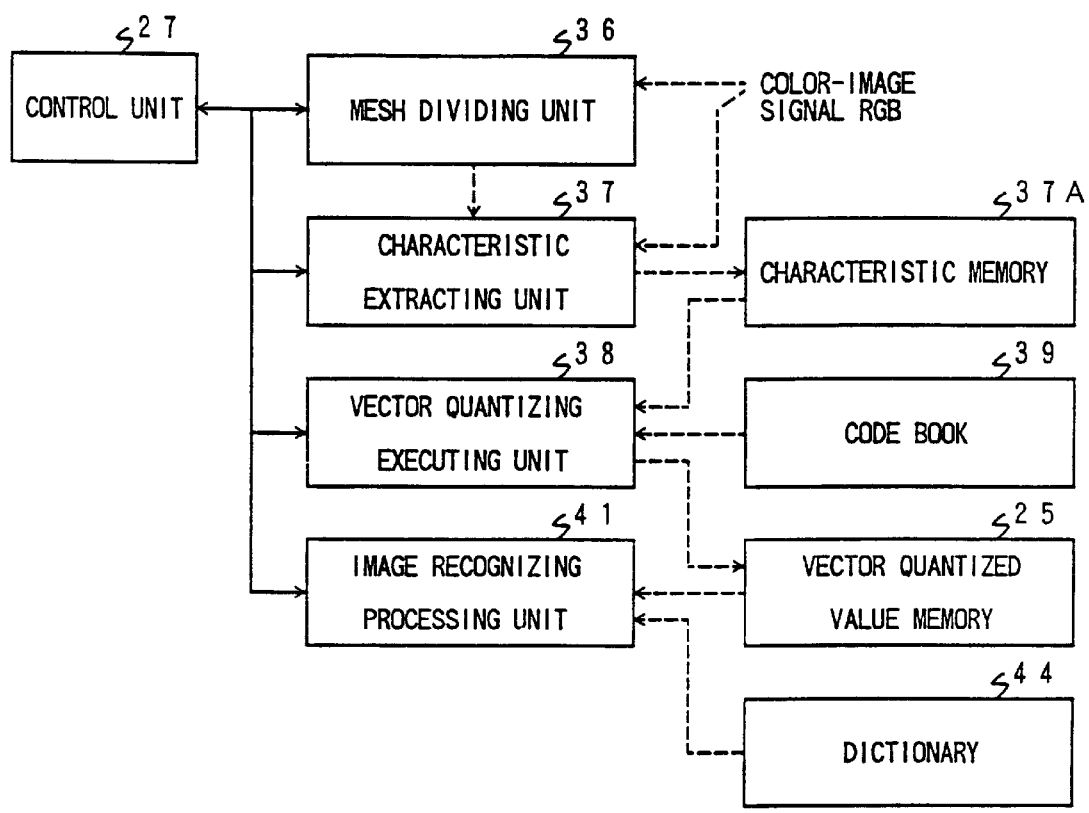
FIG. 14 shows a block diagram of a color image recognition system in a sixth embodiment of color image recognition method and apparatus according to the present invention.

The color image recognition system in the sixth embodiment shown in FIG. 14 operates generally identically to the operation performed by the system shown in FIGS. 6 and 7. However, differently from the operation of the system shown in FIGS. 6 and 7, the system shown in FIG. 14 performs the color image recognizing operation shown in FIG. 15, that is, the object recognizing operation in the system show in FIGS. 6 and 7, for the entirety of the input color image. The steps S201, S202A, S202B, S204, and S205 are substantially the same as the steps having the same step numbers shown in FIG. 11B, respectively. Further, a characteristic memory 37A is used to temporarily store the chromaticities Pr and Pg therein obtained through the above-mentioned equations (1) and (2) by characteristic extracting unit 37. The vector quantizing executing unit 38 uses the thus-stored chromaticities Pr and Pg as described above. The system in the sixth embodiment shown in FIG. 14 performs substantially identically to the operation performed by the system in the fifth embodiment shown in FIGS. 6 and 7, except for the above mentioned points.

Figure 15:
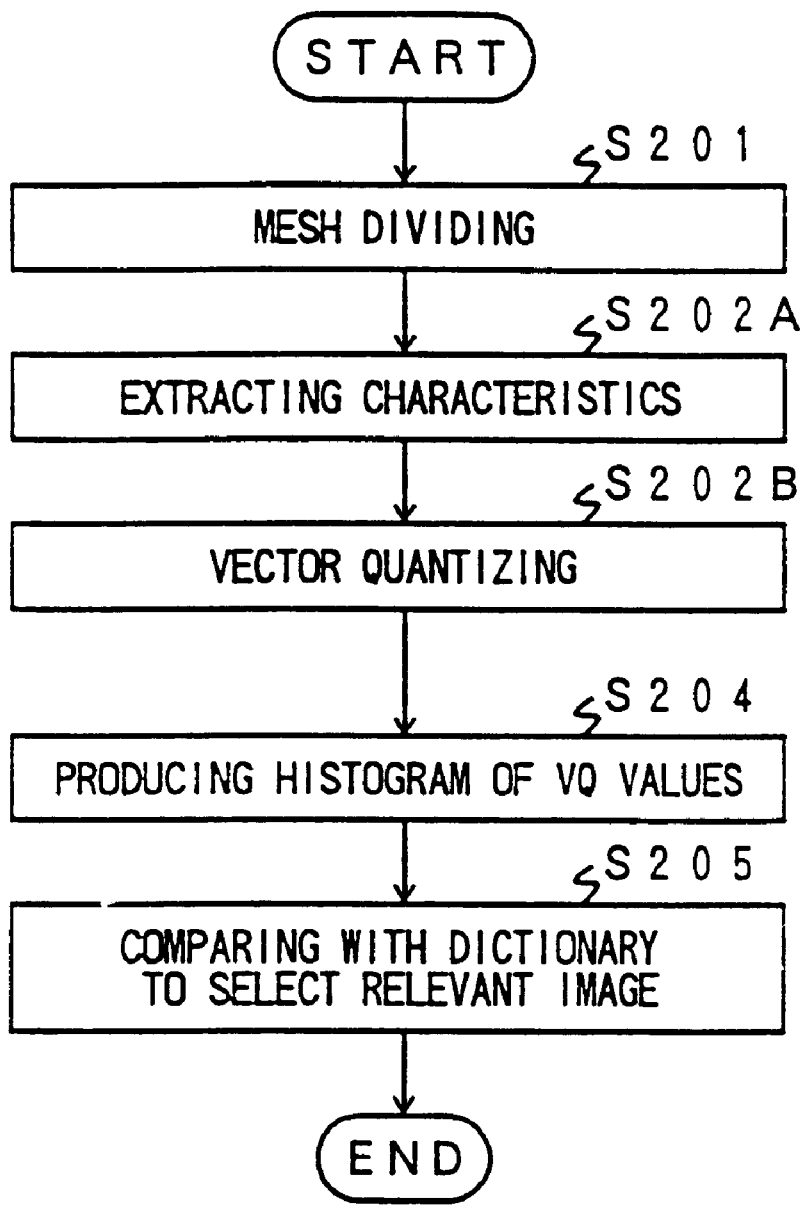
FIG. 15 shows an operation flow of the system shown in FIG. 14.

The image recognizing processing unit 41 shown in FIG. 14, in the step S205 shown in FIG. 15, identifies the currently processed color image which is represented by the input color-image signal (signals R, G and B) to correspond to an image among a plurality of images. Each of the plurality of images is represented by a respective one of the histograms of vector quantized values $T_0, T_1, T_2, \ldots$ shown in FIG. 13. That is, the unit 41 compares the histogram 601 representing the currently processed image with each of the histograms of vector quantized values $T_0, T_1, T_2, \ldots$ included in the dictionary information 602 so as to identify the currently processed image to correspond to one of the plurality of images (reference images). Thus, for example, in the above-mentioned example in which such image recognition method may be applied to works in a police office, a face of a suspected person or a montage picture of the face may be identified to correspond to one included in the database of criminals' face photographs.

According to the color image recognition system in the sixth embodiment, the same advantages as those obtained through the applying of the vector quantizing operation in the above-described system in the fifth embodiment will be obtained.

A color image recognition system in a seventh embodiment of a color image recognition method and apparatus according to the present invention will now be described. The system in the seventh embodiment is substantially identical to the above-described system in the sixth embodiment, and performs substantially identically to the operation performed by the above-described system in the sixth embodiment, except for the following point:

In the system in the above-described sixth embodiments, the mesh dividing unit 36 divides the small regions as described above and obtains image data of, for example, the 64 pixels×64 pixels for each small region to be processed by the characteristic extracting unit 37. However, in the system in the seventh embodiment, the number of pixels of which image data obtained to be processed by the unit 37 is reduced. Specifically, for example, pixels are sampled from the 64 pixels×64 pixels in each small region so that 7 pixels, along each of the vertical and horizontal directions, are left between each two pixels to be sampled. FIG. 16 illustrates the manner of such a sampling operation. FIG. 16 shows a corner of the above-mentioned color image, similar to that shown in FIG. 8. Similarly, a finer grid shown in FIG. 8 indicates pixels of pixels constituting the relevant color images and a coarser grid indicates the small regions divided by the mesh dividing unit 36. In the example, each small region of the small regions consists of 64 pixels×64 pixels. With reference to FIG. 16 in comparison to FIG. 8, hatched squares among squares shown in FIG. 16 are the small regions to be actually used in obtaining the chromaticities Pr and Pg. Thus, the number of pixels to be sampled is a number of $\frac{1}{8} \times \frac{1}{8}$ the 64×64, that is, 64·$\frac{1}{8}$×64·$\frac{1}{8}$, for each small region. Image data of the thus-reduced number of pixels, that is, the thus compressed image data may be processed by the characteristic extracting unit 37 to obtain the chromaticities Pr and Pg. By reducing the number of pixels to be used as described above, it is possible to effectively reduce the scale of the relevant parts of the system and effectively reduce time required for the processing of the pixel data.

A color image recognition system in an eighth embodiment of a color image recognition method and apparatus according to the present invention will now be described. The system in the eighth embodiment is substantially identical to the above-described system in the sixth embodiment, and performs substantially identically to the operation performed by the above-described system in the sixth embodiment, except for the following point.

According to the above-described sixth embodiment, the chromaticity histogram has 512 chromaticity dimensions as described above in the description of the fifth embodiment with reference to FIG. 9. Since the number of the chromaticity dimensions is relatively large, the relevant memory capacity is required to be large and time required to compare the input image with the reference images (matching) is long.

In the eighth embodiment, the number of the chromaticity dimensions is reduced to, for example, 64 dimensions. The chromaticity histograms obtained using the thus-reduced number of the chromaticity dimensions are then used in the subsequent image recognizing process (S202B, S204, and S205 shown in FIG. 15). The reduction of the chromaticity dimensions is performed as follows.

First, the above-mentioned Pr and Pg are obtained through the above-mentioned equations (1) and (2) . Then, If Pr≦64, new Pr=0;
if 64<Pr≦192, new Pr=(Pr−64)/4; and
if 192<Pr, new Pr=31.
If Pg≦64, new Pg=32;
if 64<Pr<192, new Pg=(Pr−64)/4+32; and
if 192<Pr, new Pg=63.

Then, the chromaticities new Pr 0 through 31 corresponds to the 32 chromaticity dimensions (i=0 through 31) and the chromaticities new Pg 32 through 63 corresponds to the 32 chromaticity dimensions (i=32 through 63). Thus, the chromaticity histograms, each having 32 chromaticity dimensions are produced.

According to the systems in the seventh and eighth embodiments, data amount can be effectively reduced.

A color image recognition system in a ninth embodiment of a color image recognition method and apparatus according to the present invention will now be described. The system in the ninth embodiment is substantially identical to the above-described system in the sixth embodiment, and performs substantially identically to the operation performed by the above-described system in the sixth embodiment, except for the following point.

Figure 17:
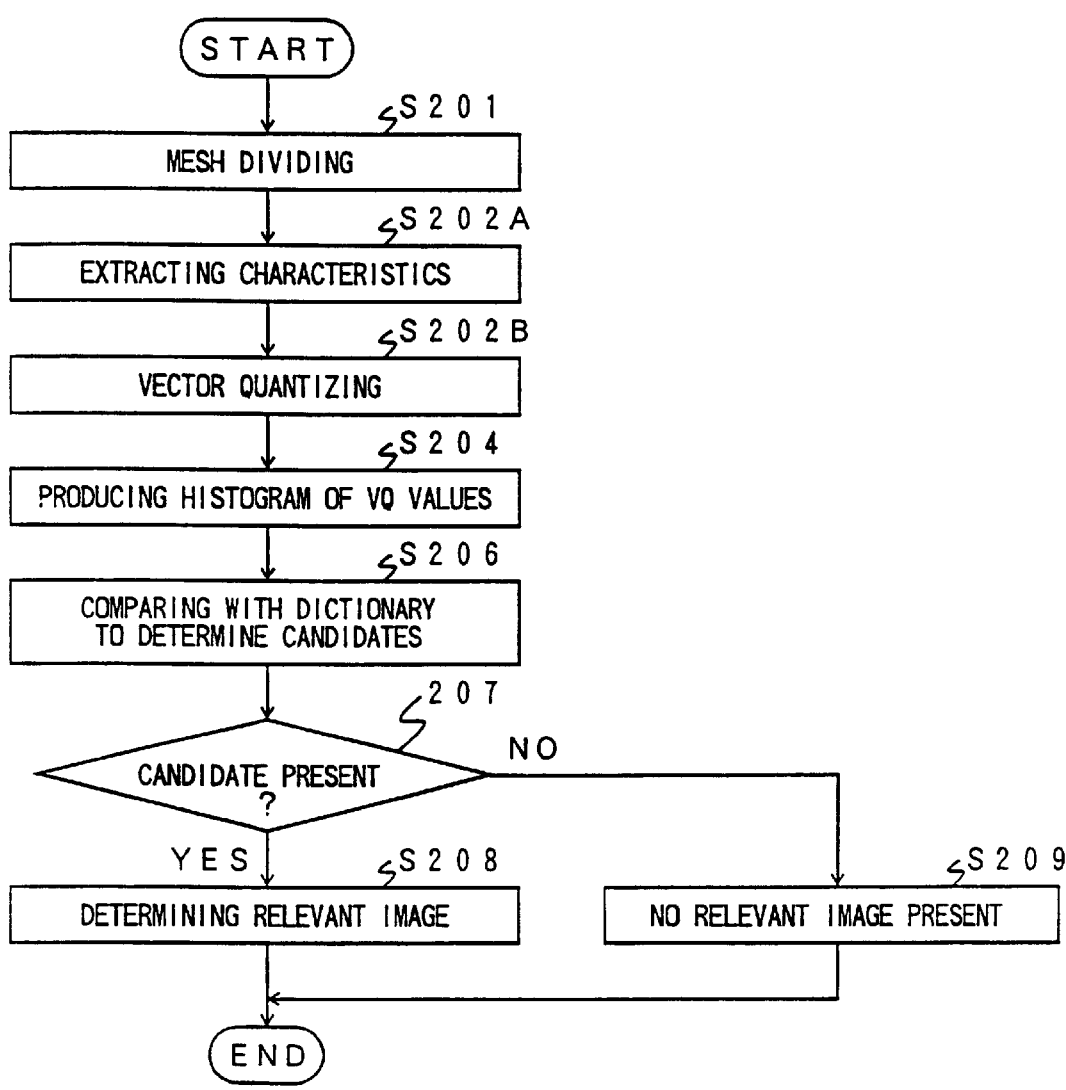
FIG. 17 shows an operation flow of an operation performed by color image recognition systems in ninth and tenth embodiments of color image recognition method and apparatus according to the present invention.

The above point relates to the comparison (matching) operation of the input image with the plurality of images included in the dictionary information 602 performed by the image recognizing processing unit 41 shown in FIG. 14. A threshold value for the distances DTk, which are shown in FIG. 13, is previously provided. With reference to FIG. 17, in a step S206, if the distance DTk is equal to or smaller than the threshold value, it is determined that the relevant histogram Tk among those $T_1$, $T_2$, $T_3$, . . . included in the dictionary information 602 may correspond to the input image. However, if the distance DTk is larger than the threshold value, it is determined that the relevant histogram Tk among those $T_1$, $T_2$, $T_3$, . . . included in the dictionary information 602 does not correspond to the input image. Thus, candidates of the histograms are determined from among those $T_1$, $T_2$, $T_3$, . . . . If no candidates are present in the dictionary information 602, it is determined in a step S209 that no reference image corresponds to (matches) the input image. If it is determined that some candidates are present as a result of the step S206, a step S208 determines one of the thus-determined candidates, which one has the minimum distance DTk among those of the candidates. By this method, it is possible to determine that the input image does not match any of the images included in the dictionary information. Thus, it is possible to improve accuracy in the image recognition.

A color image recognition system in a tenth embodiment of a color image recognition method and apparatus according to the present invention will now be described. The system in the ninth embodiment is substantially identical to the above-described system in the ninth embodiment, and performs substantially identically to the operation performed by the above-described system in the ninth embodiment, except for the following point.

The point relates to the above-mentioned threshold value for the distances DTk provided in the above-described ninth embodiment. In the system in the tenth embodiment, the above-mentioned threshold value is determined depending on each image among the images which are stored as the histograms $T_1$, $T_2$, $T_3$, . . . in the dictionary 44. Thus, it is possible to provide a number of threshold values different from one another, the number being the same as the number of histograms $T_1$, $T_2$, $T_3$, . . . . In the histogram comparison step S206 shown in FIG. 17, the distance DTk ($DT_1$, $DT_2$, $DT_3, \ldots$) is obtained for each one of the histograms $T_1$, $T_2$, $T_3, \ldots$. Then, each of the thus-obtained distances DTk is compared with the respective one of the threshold values given to the histograms $T_1$, $T_2$, $T_3, \ldots$. Thus, the candidate is determined such that the histogram, the distance DTk of which is equal to or smaller than the relevant threshold value, can be the candidate. If the distance DTk is larger than the relevant threshold value, the relevant histogram cannot be the candidate. By this method, it is possible to perform the image matching processing flexibly to be appropriate to characteristics of each image of the images, the histograms of which are stored in the dictionary 44. Specifically, for example, an image k among the images stored in the dictionary in the form of the histograms has characteristics such that the image k is very similar in their histograms to another image j. In such a case, the threshold value for the image k may be small enough so that, if the input image actually corresponds to the image j, it is possible to determine the input image does not match the image k in the step S206. Thus, it is possible to prevent such a similar but different image from being determined to match the relevant image k in the step S208. Thus, it is possible to further improve accuracy in the image recognition.

A color image recognition system in an eleventh embodiment of a color image recognition method and apparatus according to the present invention will now be described with reference to FIG. 18. The system in the eleventh embodiment is substantially identical to the above-described system in the sixth embodiment shown in FIG. 14, and performs substantially identically to the operation performed by the above-described system in the sixth embodiment, except for certain points which will be described later. Elements of the system shown in FIG. 18 substantially identical to those of the system shown in FIG. 14 have the same reference numerals as those of the corresponding elements of the system shown in FIG. 14, description of these element being thus omitted.

Figure 18:
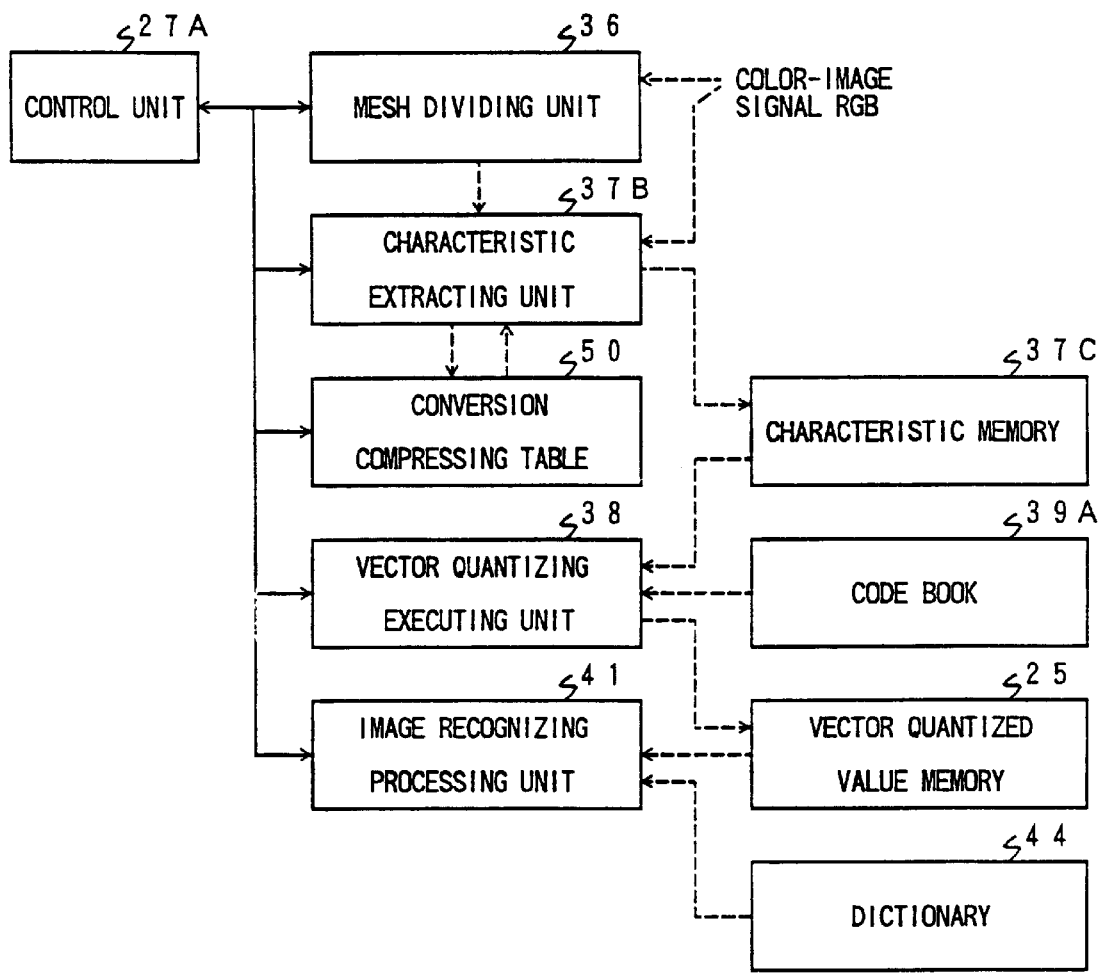
FIG. 18 shows a block diagram a of color image recognition system in an eleventh embodiment of color image recognition method and apparatus according to the present invention.

The control unit 27A overall controls the other units shown in FIG. 18. The characteristic extracting unit 37B and a conversion compressing table 50 produce chromaticity histograms different from the chromaticity histograms produced by the characteristic extracting unit 37 shown in FIG. 14. Similarly, the code book stores the code book information consisting of the characteristic histograms previously provided in a manner the same as the manner in which the chromaticity histogram extracting unit 37B and conversion compressing table 50 produce the chromaticity histograms. The chromaticity histograms are produced for each small region of the above-described small regions constituting the input color image similarly to the relevant operation in the system in the sixth embodiment. The thus-produced chromaticity histograms are stored in the characteristic memory 37C and then used by the vector quantizing unit 38 similarly to the relevant operation in the system in the sixth embodiment.

The characteristic extracting unit 37B, for each pixel of the pixels constituting the relevant small region, uses the input color image signals R, G and B and thus obtains the above-mentioned chromaticities Pr, Pg and Pb through, for example, the following equations (1), (2) and (3):

$$Pr = 255 \cdot R/(R+G+B) \quad (1),$$

$$Pg = 255 \cdot G/(R+G+B) \quad (2),$$

and $$Pb = 256 \cdot B/(R+G+B) \quad (3).$$

The characteristic extracting unit 37B causes the thus-obtained chromaticities Pr, Pg and Pb to undergo data compression process using the conversion compressing table 50. One embodiment of the data compression process will now be described with reference to FIG. 19. According to the compression converting table 50 shown in FIG. 19, for each chromaticity of the chromaticities Pr, Pg and Pb, a chromaticity range consisting of the 256 chromaticities 0 through 255 is converted into a chromaticity range consisting of 16 chromaticities 0 through 15. For example, a chromaticity 255 is converted into 15. Further, the data conversion of the conversion compressing table 50 is performed according to a conversion curve 51, not linear, shown in FIG. 19. That is, in a part where the input value is a small value, that is, the left side in FIG. 19, a a small number of the input values are converted into the single output value. However, in a part where the input value is a large value, that is, the left side in FIG. 19, a large number of the input values are converted into the single output value.

Figure 19:
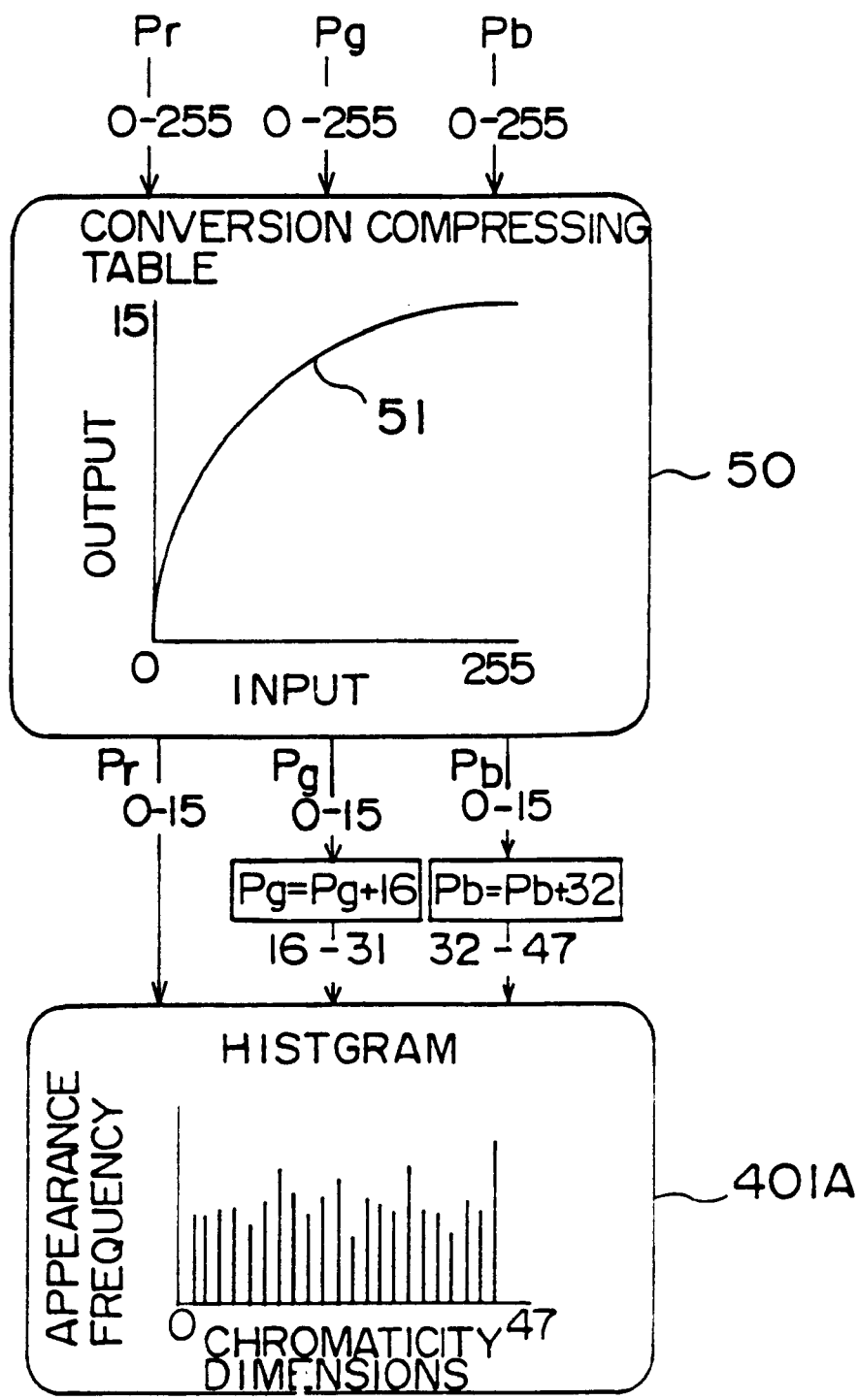
FIG. 19 illustrates a conversion compressing operation performed by a characteristic extracting unit 37B using a conversion compressing table 50 shown in FIG. 18.

The characteristic extracting unit 37B uses the thus-obtained chromaticities Pr, Pg and Pb, and produces the chromaticity histograms 401A, an example of which is shown in FIG. 19. The above-mentioned conversion using the conversion compressing table 50 can reduce the chromaticity dimensions which corresponds to the scale of each of the chromaticity histograms. Thus, the relevant memory capacity can be reduced and also the matching processing (image recognition operation) can be performed in high speed.

As shown in FIG. 19, each of the histogram 401A has the horizontal axis of the 47 chromaticity dimensions (i=0 through 48). Among the 47 chromaticity dimensions, the first 16 dimensions (i=0 through 15) correspond to the 16 chromaticities of Pr, the second 16 dimensions (i=16 through 31) correspond to the 16 chromaticities of Pg, the last 16 dimensions (i=32 through 47) correspond to the 16 chromaticities of Pb. Similar to the histograms 401 shown in FIG. 9, a height of each of the bars upward projecting from the respective chromaticity dimension represents the relevant appearance frequency of the chromaticities for the relevant small region.

The data compression ratio is not limited to the above-mentioned ratio of 16 to 256. Various data compression ratios can be applied appropriately Further, the above-described characteristic extracting operation is not limited to that using the chromaticities Pr, Pg and Pb. Instead of the chromaticities, the YMC (Yellow, Magenta and Cyan) signals may be used as characteristic values to produce histograms instead of the chromaticity histograms. The YMC signals are obtained as a result of appropriately converting the RGB signals. Further, the Lab signals (corresponding to the values in the known L*a*b* color space, that is, CIE1976 L*a*b* color space) may be used as characteristic values to produce histograms instead of the chromaticity histograms.

Figure 20:
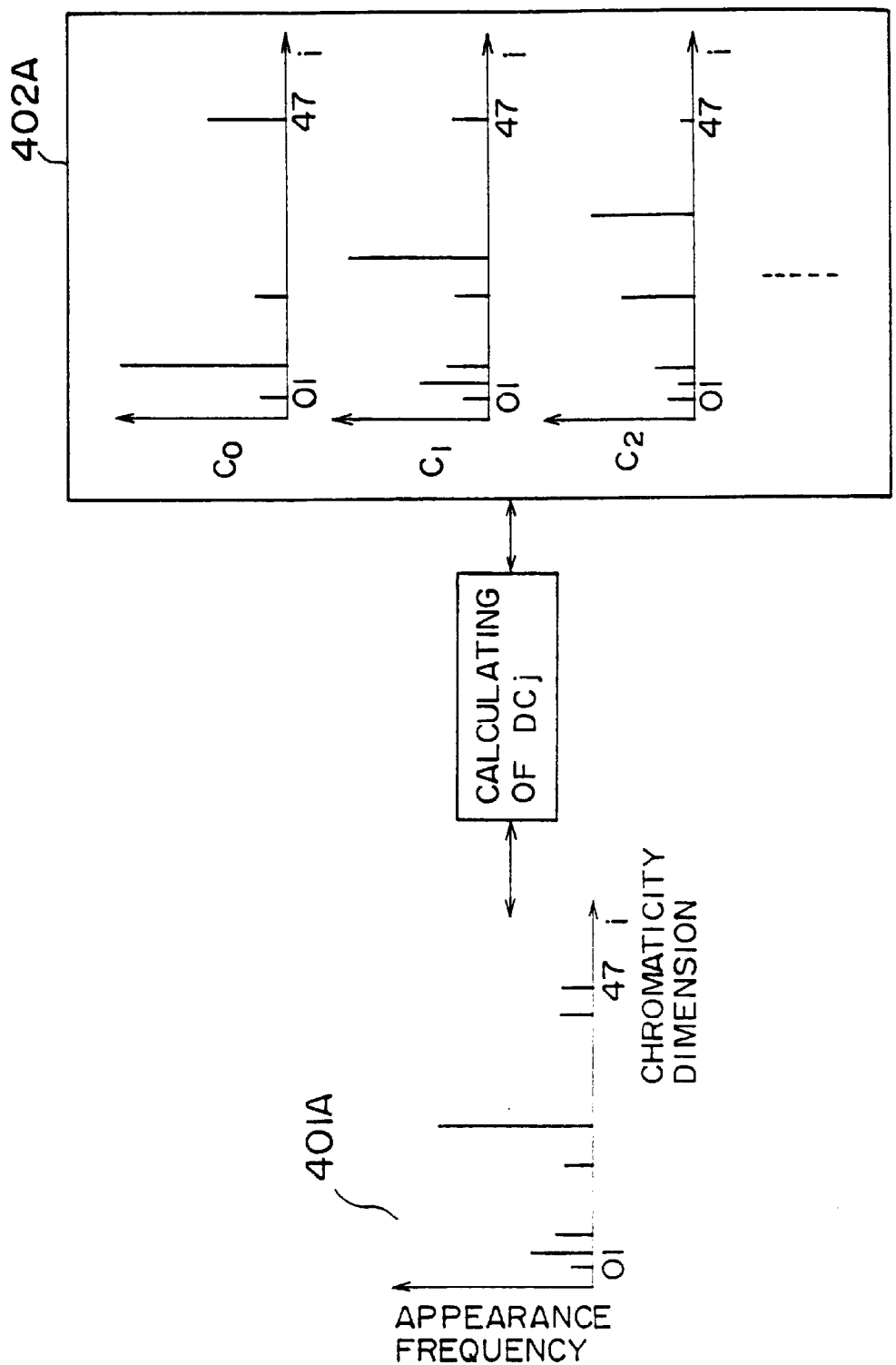
FIG. 20 illustrates a vector quantizing operation performed by a vector quantizing unit 38 shown in FIG. 18.

FIG. 20 is identical to FIG. 9, except for the number of chromaticity dimensions of each chromaticity histogram of the histogram 401 or 401A of the input image and the histograms $C_0, C_1, C_2, \ldots$ of the code book information 402 or 402A. In FIG. 9, the number of chromaticity dimensions is 512 while in FIG. 20, the same is 48.

A color image recognition system in a twelfth embodiment of a color image recognition method and apparatus according to the present invention will now be described. The system in the twelfth embodiment is substantially identical to the above-described system in the eleventh embodiment, and performs substantially identically to the operation performed by the above-described system in the eleventh embodiment, except for the following point.

The operation performed by the vector quantizing unit 38 is different from that in the system in the eleventh embodiment. In the system in the eleventh embodiment, the chromaticity histograms produced for all the small regions are uniformly compared with all the histograms stored in the code book 39A. As a result, the VQ values are given to the small regions as shown in FIG. 10. However, in the system in the twelfth emoodiment, manners in which the histograms of the small regions are compared with the code book information are different among the small regions. The manners are determined as a result of examining the relevant histograms of the small regions. Thus, the small regions constituting certain part in the input image are substantially omitted from being used to compared with the code book information. The above-mentioned certain part is, for example, in the input image, a background with respect of a relevant foreground, or a white sheet being exposed around a something printed on the white sheet, each of the foreground and the something being essential to be recognized but each of the background and the exposed white sheet being not necessary to be examined. Each of the background and the white sheet may include therein noise patterns which may adversely affect the proper recognition performance of the color image recognition system. By removing such extra data from being substantially examined, it is possible to improve recognition (identification) success ratio and to improve data processing rate (percentage).

Generally speaking, in such a background or an exposed white sheet, image density is uniform in each of the small regions. As a result, the chromaticity histogram produced for the small region should be such that the appearance frequencies at specific concentrated ones among the series of chromaticity dimensions in the horizontal axis scale are very large, and those at the other ones are very small. That is, it is likely that the maximum value of the appearance frequencies is large, and those of the significant values are distributed at a narrow extent in the horizontal axis scale. Such a general phenomenon is used so that if the maximum value of the appearance frequencies in the relevant small region exceeds a predetermined threshold value, the vector quantizing unit 38 determines that the relevant small region corresponds to an image part in which an image density is uniform all over, that is, the above-mentioned certain part which should be removed from further examination. The unit 38 thus gives a specific VQ value, such as "0" to the relevant small region. The unit 38 then treats the small regions having the VQ value "0" as ones to be ignored. Instead of giving the specific VQ value if the maximum appearance frequency exceeds the predetermined value, it is also possible to prevent the comparison with the code book information 402A if an appearance frequency exceeds a predetermined value. Thus, a certain part in the input image can be removed from being further processed (from undergoing the vector quantizing process), the certain part being a part in which color is generally uniform all over.

Instead of determining such a part in the input image as that to be omitted from being further processed using the heights of the histograms as described above, it is also possible to further use information of a width in the histogram, for which width appearance frequencies of significant values are concentratedly distributed, for the same determination.

Further, for the same determination, it is also possible to use information as to which part in the horizontal axis scale the appearance frequencies of significant values are distributed. For example, a white background part is found out to be omitted from being further processed. By such a method, it is possible to remove noise image information from being further processed. As described above, the noise image information may be included in relevant information as a result of, for example, an image scanner reads in information of not only an relevant image printed on a relevant sheet but also another image which is printed on another sheet subsequent to the relevant sheet. In such a case, the white background part even including such noise are generally white so that the above-mentioned method in which information as to which part in the horizontal axis scale the appearance frequencies of significant values are distributed is used.

Further, instead of determining such a part in the input image as that to be omitted from being further processed using the heights of, widths of, and positions in the histograms as described above, other characteristics may be used for the same purpose. The other characteristics are those obtained as a result of analyzing the histograms. color image recognition system in a thirteenth embodiment of a color image recognition method and apparatus according to the present invention will now be described. The system in the thirteenth embodiment is substantially identical to the above-described system in the eleventh embodiment, and performs substantially identically to the operation performed by the above-described system in the eleventh embodiment, except for the following point.

In the system in the eleventh embodiment, a VQ value is given to each small region if the above-described distance DCj between the histogram 401A of the small region and that of the relevant histogram of the code book information 402A is the smallest among the histograms of the code book information 402A. However, as described above, the code book information may be formed as a result of clustering a huge number of various images. As a result, if the input image is different from any one of the images, the histograms of which are stored as the dictionary information 602 shown in FIG. 13, the distance DCj between the histogram of the input image and each of the histograms of the code book information may be large. In this embodiment, if the minimum distance DCj has a value larger than a predetermined threshold value, no VQ value is given to the relevant small region in the vector quantizing unit 38. As a result, the matching (comparison with the dictionary information) process performed by the image recognizing unit 41 using the thus produced VQ values can be simplified in such a case. As a result, it is possible that the image recognizing unit 41 determines that the dictionary 44 has no data matching the input image if no significant VQ values are given to the input image. Thus, it is possible to achieve high-speed determination.

A color image recognition system in a fourteenth embodiment of a color image recognition method and apparatus according to the present invention will now be described. The system in the fourteenth embodiment is substantially identical to the above-described system in the eleventh embodiment, and performs substantially identically to the operation performed by the above-described system in the eleventh embodiment, except for the following point.

The above point relates to the comparison (matching) operation of the input image with the plurality of images included in the dictionary information 602 performed by the image recognizing processing unit 41 shown in FIG. 18. A threshold value for the distances DTk, which are shown in FIG. 13, is previously provided. With reference to FIG. 17, in a step S206, if the distance DTk is equal to or smaller than the threshold value, it is determined that the relevant histogram Tk among those $T_1$, $T_2$, $T_3$, . . . included in the dictionary information 602 may correspond to the input image. However, if the distance DTk is larger than the threshold value, it is determined that the relevant histogram Tk among those $T_1$, $T_2$, $T_3$, . . . included in the dictionary information 602 does not correspond to the input image. Thus, candidates of the histograms are determined from among those $T_1$, $T_2$, $T_3$. . . If no candidates are present in the dictionary information 602, it is determined in a step S209 that no reference image corresponds to (matches) the input image. If it is determined that some candidates are present as a result of the step S206, a step S208 determines one of the thus-determined candidates, which one has the minimum distance DTk among those of the candidates. By this method, it is possible to determine that the input image does not match any of the images included in the dictionary information. Thus, it is possible to improve accuracy in the image recognition.

A color image recognition system in a fifteenth embodiment of a color image recognition method and apparatus according to the present invention will now be described. The system in the fifteenth embodiment is substantially identical to the above-described system in the fourteenth embodiment, and performs substantially identically to the operation performed by the above-described system in the fourteenth embodiment, except for the following point.

The point relates to the above-mentioned threshold value for the distances DTk provided in the above-described fourteenth embodiment. In the system in the fifteenth embodiment, the above-mentioned threshold value is determined depending on each image among the images which are stored as the histograms $T_1$, $T_2$, $T_3$, . . . in the dictionary 44. Thus, it is possible to provide a number of threshold values different from one another, the number being the same as the number of histograms $T_1$, $T_2$, $T_3$, . . . . In the histogram comparison step S206 shown in FIG. 17, the distance DTk ($DT_1$, $DT_2$, $DT_3$, . . . ) is obtained for each one of the histograms $T_1$, $T_2$, $T_3$, . . . Then, each of the thus-obtained distances DTk is compared with the respective one of the threshold values given to the histograms $T_1$, $T_2$, $T_3$, . . . . Thus, the candidate is determined such that the histogram, the distance DTk of which is equal to or smaller than the relevant threshold value, can be the candidate. If the distance DTk is larger than the relevant threshold value, the relevant histogram cannot be the candidate. By this method, it is possible to perform the image matching processing flexibly to be appropriate to characteristics of each image of the images, the histograms of which are stored in the dictionary 44. Specifically, for example, an image k among the images stored in the dictionary in the form of the histograms has characteristics such that the image k is very similar in their histograms to another image j. In such a case, the threshold value for the image k may be small enough so that, if the input image actually corresponds to the image j, it is possible to determine the input image does not match the image k in the step S206. Thus, it is possible to prevent such a similar but different image from being determined to match the relevant image k in the step S208. Thus, it is possible to further improve accuracy in the image recognition.

Further, the present invention is not limited to the above-described embodiments, and variations and modifications may be made without departing from the scope of the present invention.

What is claimed is:

1. An object extraction method, comprising steps of:
   a) determining a circumscribing rectangle from an input two-tone image signal;
   said circumscribing rectangle being a rectangle circumscribing an image part which consists of continuous pixels, each of said pixels being a pixel of a predetermined same tone;
   b) detecting contact positions at which said circumscribing rectangle comes into contact with said image part; and
   c) determining whether or not said image part is identical to a given object, the determination being performed using said contact positions.

2. The object extraction method according to claim 1, wherein:
   said given object has a rectangular shape, said rectangular shape of said given object having predetermined lengths of sides thereof; and
   said step c) comprises steps of:
      c-1) determining, based on an assumption that said image part has a rectangular shape, lengths of sides of said rectangular shape of said image part;
      c-2) comparing said lengths of sides of said rectangular shape of said image part with said predetermined lengths of sides of said rectangular shape of said object; and
      c-3) determining whether or not said image part is identical to said given object, based on a result of comparison performed through said step c-2).

3. The object extraction method according to claim 2, further comprising a step of
   d) determining whether or not said image part is an image part obtained as a result of rotating said rectangular shape of said object;
   and wherein:
   said step c-1) can properly determine lengths of sides of said rectangular shape of said image part using a determination result given by said step d).

4. The object extraction method according to claim 1, further comprising steps of:
   e-1) obtaining a first one of said input two-tone image signal from an input color image signal, in a first manner, as a result of comparing a lightness value represented by said input color image signal with a first threshold value;
   e-2) obtaining a second one of said input two-tone image signal from said input color image signal, in a second manner, as a result of comparing said lightness value represented by said input color image signal with a second threshold value;
   and wherein said step a) determines a first one of said circumscribing rectangle from said first one of said input two-tone image signal, and determines a second one of said circumscribing rectangle from said second one of said input two-tone image signal.

5. The object extraction method according to claim 4, further comprising steps of
   f) determining whether or not said first one of said circumscribing rectangle geometrically completely includes said second one of said circumscribing rectangle, and determining whether or not said second one of said circumscribing rectangle geometrically completely includes said first one of said circumscribing rectangle; and
   e) removing a certain one of said first one and second one of said circumscribing rectangles from undergoing said steps b) and c), if said step f) has determined that said certain one geometrically completely includes a remaining one of said first one and second one of said circumscribing rectangles.

6. An object extraction apparatus, comprising:

means for determining a circumscribing rectangle from an input two-tone image signal;

said circumscribing rectangle being a rectangle circumscribing an image part which consists of continuous pixels, each of said pixels being a pixel of a predetermined same tone;

means for detecting contact positions at which said circumscribing rectangle comes into contact with said image part; and means for determining whether or not said image part is identical to a given object, the determination being performed using said contact positions.

* * * * *

UNITED STATES PATENT AND TRADEMARK OFFICE
CERTIFICATE OF CORRECTION

| | |
|---|---|
| PATENT NO. | : 6,181,820 B1 |
| DATED | : January 30, 2001 |
| INVENTOR(S) | : Michiyoshi Tachikawa, et al. |

Page 1 of 1

It is certified that error appears in the above-identified patent and that said Letters Patent is hereby corrected as shown below:

<u>Title page,</u>
Item [30], the 4th Foreign Application Priority Data is incorrectly listed.
Item [30] should read as follows:

[30] Foreign Application Priority Data

Dec. 10, 1993  (JP) ..................... 5-310694
Dec. 10, 1993  (JP) ..................... 5-310696
Feb. 15, 1994  (JP) ..................... 6-18591
Mar. 23, 1994  (JP) ..................... 6-52286

Signed and Sealed this

Twenty-third Day of October, 2001

Attest:

NICHOLAS P. GODICI
*Attesting Officer*     *Acting Director of the United States Patent and Trademark Office*